United States Patent
Liu et al.

(10) Patent No.: US 11,375,241 B2
(45) Date of Patent: Jun. 28, 2022

(54) FREQUENCY SPECIFIC COMPRESSION AND COMPENSATION TECHNIQUE IN IMAGE PROCESSING

(71) Applicant: ALIBABA GROUP HOLDING LIMITED, Grand Cayman (KY)

(72) Inventors: Zihao Liu, San Mateo, CA (US); Sicheng Li, San Mateo, CA (US); Minghai Qin, San Mateo, CA (US); Yen-kuang Chen, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 67 days.

(21) Appl. No.: 17/075,241

(22) Filed: Oct. 20, 2020

(65) Prior Publication Data
US 2022/0124375 A1   Apr. 21, 2022

(51) Int. Cl.
| | |
|---|---|
| *H04N 19/00* | (2014.01) |
| *H04N 19/85* | (2014.01) |
| *G06T 5/50* | (2006.01) |
| *H04N 19/124* | (2014.01) |
| *H04N 19/60* | (2014.01) |
| *G06T 3/40* | (2006.01) |

(52) U.S. Cl.
CPC .............. *H04N 19/85* (2014.11); *G06T 3/40* (2013.01); *G06T 5/50* (2013.01); *H04N 19/124* (2014.11); *H04N 19/60* (2014.11)

(58) Field of Classification Search
CPC ...... G06T 9/00; H04N 19/124; H04N 19/136; H04N 19/172; H04N 19/176; H04N 19/625
See application file for complete search history.

(56) References Cited

U.S. PATENT DOCUMENTS

| | | | | |
|---|---|---|---|---|
| 5,774,597 A | * | 6/1998 | Wilson | .................... G06T 9/007 |
| | | | | 375/240.2 |
| 2010/0067574 A1 | * | 3/2010 | Knicker | ................. H04N 19/44 |
| | | | | 375/240.12 |
| 2017/0324958 A1 | * | 11/2017 | Tandon | ................ H04N 19/172 |

* cited by examiner

*Primary Examiner* — Li Liu
(74) *Attorney, Agent, or Firm* — Finnegan, Henderson, Farabow, Garrett & Dunner, LLP

(57) ABSTRACT

The present disclosure relates to a method for compensating an image. The method comprises estimating transform coefficients of a frequency component for a first image based on the first image, performing a dot multiplication operation between the estimated transform coefficients and a basis function associated with the frequency component to generate a compensation image, and combining the first image and the compensation image to generate a combined image.

20 Claims, 17 Drawing Sheets

FREQUENCY SPECIFIC COMPRESSION AND COMPENSATION TECHNIQUE IN IMAGE PROCESSING

BACKGROUND

Lossy compression of digital images is used to reduce data size for storing, handling, and transmitting content. The degree of compression can be adjusted, allowing a selectable tradeoff between storage size, network bandwidth for transmission, and image quality. Current lossy image compression techniques such as JPEG, JPEG-2000, BPG (Big Picture Group), etc. generally compress images by discarding higher frequency components while reserving lower frequency component since human eyes are more sensitive to lower frequency information. Removing even a small portion of lower frequency information can significantly degrade image quality compared to higher frequency information. However, most of information lies at lower frequencies and takes large amounts of bits to represent the image. Accordingly, it is difficult to obtain a higher degree of compression by removing only higher frequency components. There is an increasing demand for achieving a higher compression rate without degrading image quality. There have been efforts to improve image quality based on machine-learning technologies.

SUMMARY OF THE DISCLOSURE

Embodiments of the present disclosure provide a method for compensating an image. The method comprises estimating transform coefficients of a frequency component for a first image based on the first image, performing a dot multiplication operation between the estimated transform coefficients and a basis function associated with the frequency component to generate a compensation image, and combining the first image and the compensation image to generate a combined image.

Embodiments of the present disclosure provide an apparatus for compensating an image. The apparatus comprises a memory for storing a set of instructions, and at least one processor configured to execute the set of instructions to cause the apparatus to perform: estimating transform coefficients of a frequency component for a first image based on the first image, performing a dot multiplication operation between the estimated transform coefficients and a basis function associated with the frequency component to generate a compensation image, and combining the first image and the compensation image to generate a combined image.

Embodiments of the present disclosure also provide a terminal comprising an encoder for compressing an image by removing a frequency component and an apparatus for compensating the frequency component for a reconstructed image of the compressed image. The apparatus comprises a memory for storing a set of instructions, and at least one processor configured to execute the set of instructions to cause the apparatus to perform: estimating transform coefficients of the frequency component for the reconstructed image based on the reconstructed image, performing a dot multiplication operation between the estimated transform coefficients and a basis function associated with the frequency component to generate a compensation image, and combining the reconstructed image and the compensation image to generate a combined image.

Additional features and advantages of the disclosed embodiments will be set forth in part in the following description, and in part will be apparent from the description, or may be learned by practice of the embodiments. The features and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

BRIEF DESCRIPTION OF THE DRAWINGS

Embodiments and various aspects of present disclosure are illustrated in the following detailed description and the accompanying figures. Various features shown in the figures are not drawn to scale.

DETAILED DESCRIPTION

Figure 1:
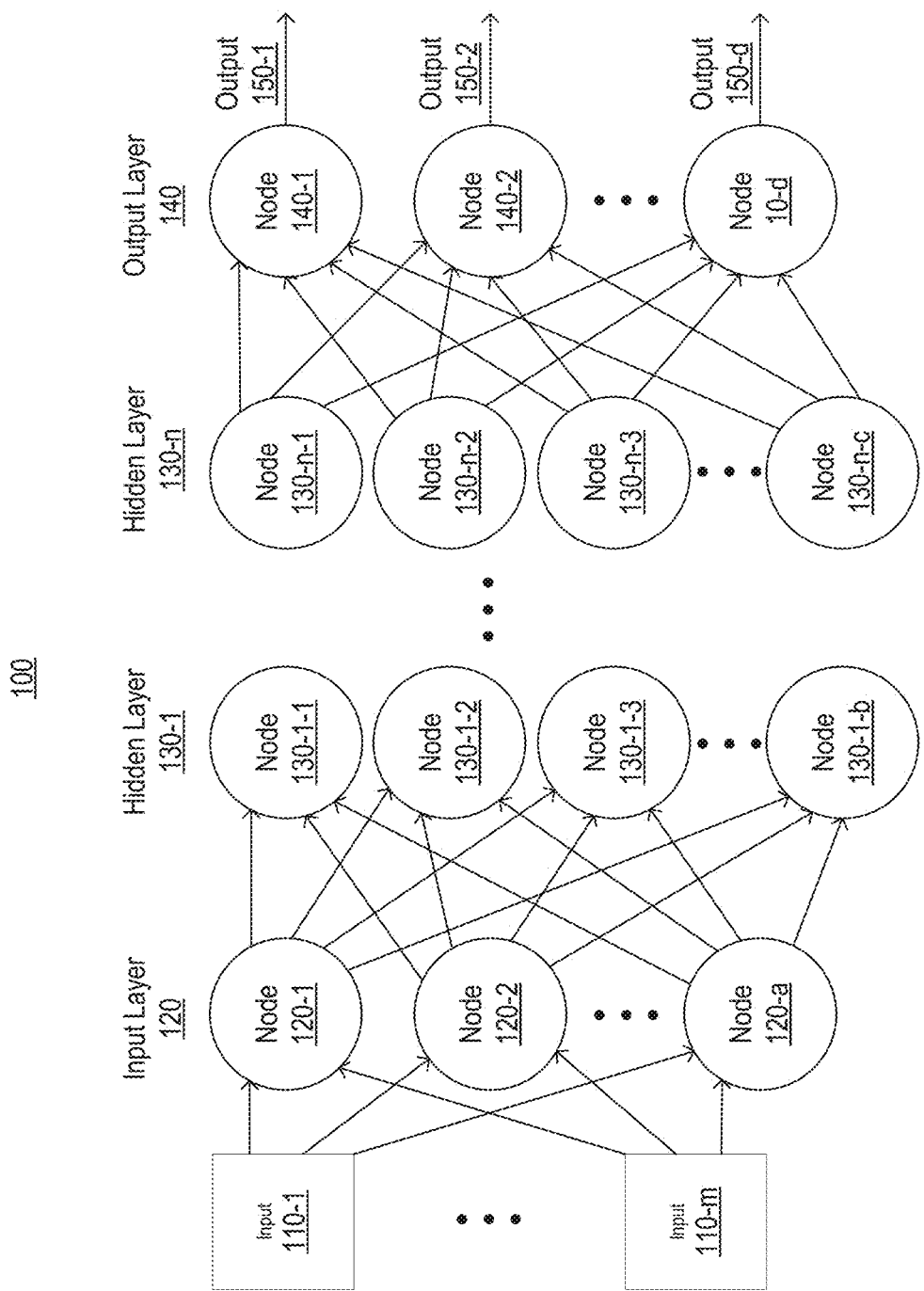
FIG. 1 is a schematic representation of a neural network, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

JPEG (Joint Photographic Experts Group) is a commonly used method of lossy compression for digital images. Lossy compression of digital images is used to reduce data size for storing, handling, and transmitting content. The degree of compression can be adjusted, allowing a selectable tradeoff between storage size, network bandwidth for transmission, and image quality. Current lossy image compression techniques such as JPEG, JPEG-2000, BPG (Big Picture Group), etc. generally compress images by discarding higher frequency components while reserving lower frequency component since human eyes are more sensitive to lower frequency information. Removing even a small portion of lower frequency information can significantly degrade image quality compared to higher frequency information. However, most of information lies at lower frequencies and takes large amounts of bits to represent the image. Accordingly, it is difficult to obtain a higher degree of compression by removing only higher frequency components. There is an increasing demand for achieving a higher compression rate without degrading image quality.

Machine learning or deep learning has been widely used in various areas, and applications of neural networks have been extended to image processing. Current filter-based machine learning algorithms focus on image denoising to remove artifacts. That is, machine learning-based methods are generally engaged in reducing artifact issues and show promising performance in those issues. However, such machine learning-based approaches may require very large and complex DNN (deep neural network) model (e.g., greater than 100 layers) because they try to recover all frequency information.

According to some embodiments of the present disclosure, an efficient image compression scheme can be provided by dynamically generating a quantization table for each image. According to some embodiments of the present disclosure, a high compression rate of an image can be obtained by selectively removing one or more frequency components including a lower frequency component. According to some embodiments of the present disclosure, a specific frequency component compensation method for images can be provided. According to some embodiments of the present disclosure, a frequency component compensation scheme requiring relatively small amounts of computation can be provided. According to some embodiments, a higher compression rate can be achieved without degrading image quality.

FIG. 1 is a schematic representation of a neural network (NN) 100. As shown in FIG. 1, neural network 100 may include an input layer 120 that accepts inputs, e.g., input 110-1, . . . , input 110-*m*. Inputs may include an image, text, or any other structure or unstructured data for processing by neural network 100. In some embodiments, neural network 100 may accept a plurality of inputs simultaneously. For example, in FIG. 1, neural network 100 may accept up to m inputs simultaneously. Additionally or alternatively, input layer 120 may accept up to m inputs in rapid succession, e.g., such that input 110-1 is accepted by input layer 120 in one cycle, a second input is accepted by input layer 120 in a second cycle in which input layer 120 pushes data from input 110-1 to a first hidden layer, and so on. Any number of inputs can be used in simultaneous input, rapid succession input, or the like.

Input layer 120 may comprise one or more nodes, e.g., node 120-1, node 120-2, . . . node 120-*a*. Each node may apply an activation function to corresponding input (e.g., one or more of input 110-1, . . . , input 110-*m*) and weight the output from the activation function by a particular weight associated with the node. An activation function may comprise a Heaviside step function, a Gaussian function, a multi-quadratic function, an inverse multi-quadratic function, a sigmoidal function, or the like. A weight may comprise a positive value between 0.0 and 1.0 or any other numerical value configured to allow some nodes in a layer to have corresponding output scaled more or less than output corresponding to other nodes in the layer.

As further depicted in FIG. 1, neural network 100 may include one or more hidden layers, e.g., hidden layer 130-1, . . . , hidden layer 130-*n*. Each hidden layer may comprise one or more nodes. For example, in FIG. 1, hidden layer 130-1 comprises node 130-1-1, node 130-1-2, node 130-1-3, . . . , node 130-1-*b*, and hidden layer 130-*n* comprises node 130-*n*-1, node 130-*n*-2, node 130-*n*-3, . . . , node 130-*n*-*c*. Similar to nodes of input layer 120, nodes of the hidden layers may apply activation functions to output from connected nodes of the previous layer and weight the output from the activation functions by particular weights associated with the nodes.

As further depicted in FIG. 1, neural network 100 may include an output layer 140 that finalizes outputs, e.g., output 150-1, output 150-2, . . . , output 150-*d*. Output layer 140 may comprise one or more nodes, e.g., node 140-1, node 140-2, . . . , node 140-*d*. Similar to nodes of input layer 120 and of the hidden layers, nodes of output layer 140 may apply activation functions to output from connected nodes of the previous layer and weight the output from the activation functions by particular weights associated with the nodes.

Although depicted as fully connected in FIG. 1, the layers of neural network 100 may use any connection scheme. For example, one or more layers (e.g., input layer 120, hidden layer 130-1, . . . , hidden layer 130-*n*, output layer 140, or the like) may be connected using a convolutional scheme, a sparsely connected scheme, or the like. Such embodiments may use fewer connections between one layer and a previous layer than depicted in FIG. 1.

Moreover, although depicted as a feedforward network in FIG. 1, neural network 100 may additionally or alternatively use backpropagation (e.g., by using long short-term memory nodes or the like). Accordingly, although neural network 100 is depicted similar to a CNN, neural network 100 may comprise a recurrent neural network (RNN) or any other neural network.

Figure 2A:
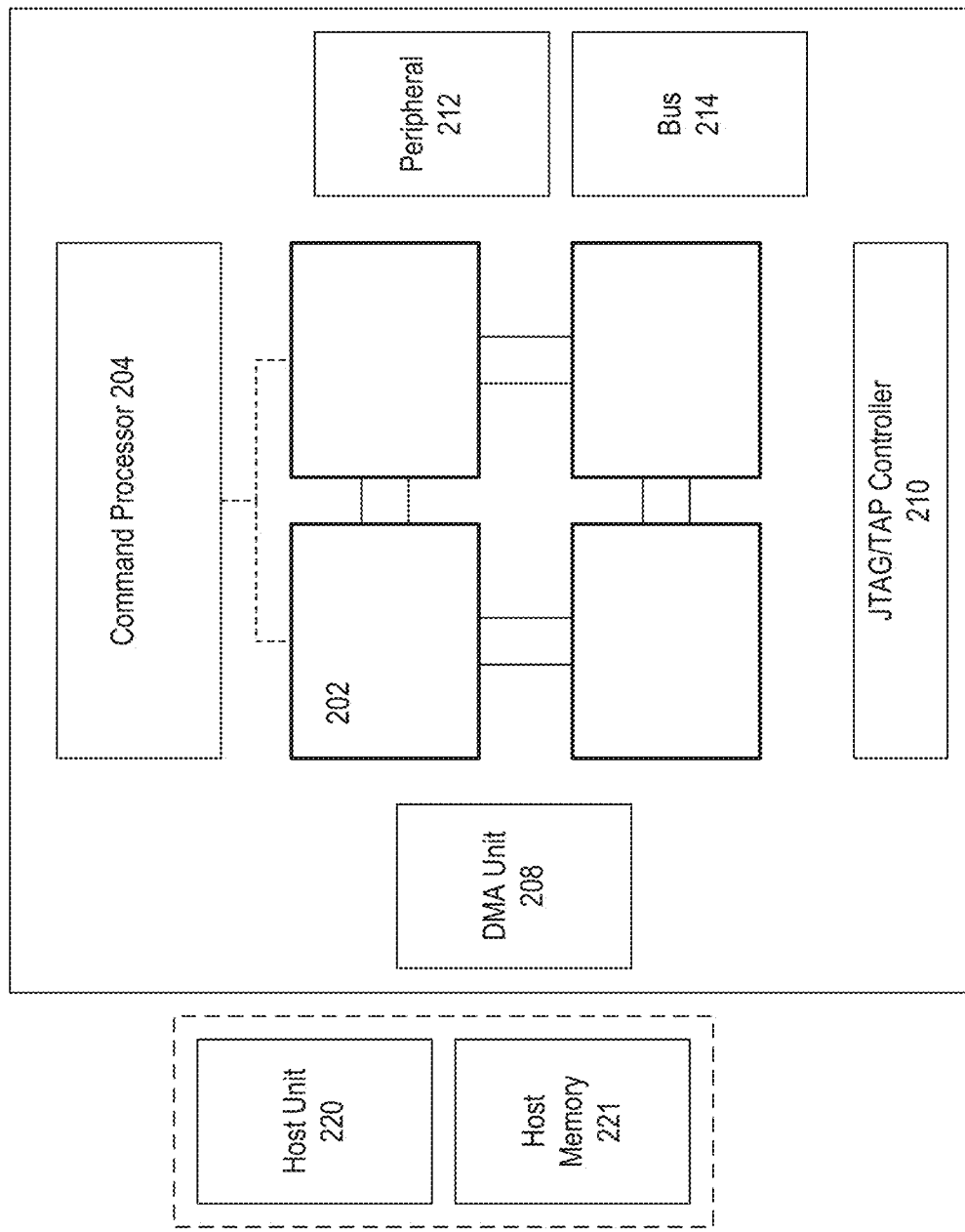
FIG. 2A illustrates an exemplary neural network accelerator architecture, consistent with some embodiments of the present disclosure.

FIG. 2A illustrates an exemplary neural network accelerator architecture, consistent with some embodiments of the present disclosure. In the context of this disclosure, a neural network accelerator may also be referred to as a machine learning accelerator or deep learning accelerator. In some embodiments, accelerator 200 may be referred to as a neural network processing unit (NPU) 200. As shown in FIG. 2A, accelerator 200 can include a plurality of cores 202, a command processor 204, a direct memory access (DMA) unit 208, a Joint Test Action Group (JTAG)/Test Access End (TAP) controller 210, a peripheral interface 212, a bus 214, and the like.

It is appreciated that, cores 202 can perform algorithmic operations based on communicated data. Cores 202 can include one or more processing elements that may include single instruction, multiple data (SIMD) architecture including one or more processing units configured to perform one or more operations (e.g., multiplication, addition, multiply-accumulate, etc.) based on commands received from command processor 204. To perform the operation on the communicated data packets, cores 202 can include one or more processing elements for processing information in the data packets. Each processing element may comprise any number of processing units. According to some embodiments of the present disclosure, accelerator 200 may include a plurality of cores 202, e.g., four cores. In some embodiments, the plurality of cores 202 can be communicatively coupled with each other. For example, the plurality of cores 202 can be connected with a single directional ring bus, which supports efficient pipelining for large neural network models. The architecture of cores 202 will be explained in detail with respect to FIG. 2B.

Command processor 204 can interact with a host unit 220 and pass pertinent commands and data to corresponding core 202. In some embodiments, command processor 204 can interact with host unit 220 under the supervision of kernel mode driver (KMD). In some embodiments, command processor 204 can modify the pertinent commands to each core 202, so that cores 202 can work in parallel as much as possible. The modified commands can be stored in an instruction buffer. In some embodiments, command processor 204 can be configured to coordinate one or more cores 202 for parallel execution.

DMA unit 208 can assist with transferring data between host memory 221 and accelerator 200. For example, DMA unit 208 can assist with loading data or instructions from host memory 221 into local memory of cores 202. DMA unit 208 can also assist with transferring data between multiple accelerators. DMA unit 208 can allow off-chip devices to access both on-chip and off-chip memory without causing a host CPU interrupt. In addition, DMA unit 208 can assist with transferring data between components of accelerator 200. For example, DMA unit 208 can assist with transferring data between multiple cores 202 or within each core. Thus, DMA unit 208 can also generate memory addresses and initiate memory read or write cycles. DMA unit 208 can also contain several hardware registers that can be written and read by the one or more processors, including a memory address register, a byte-count register, one or more control registers, and other types of registers. These registers can specify some combination of the source, the destination, the direction of transfer (reading from the input/output (I/O) device or writing to the I/O device), the size of the transfer unit, or the number of bytes to transfer in one burst. It is appreciated that accelerator 200 can include a second DMA unit, which can be used to transfer data between other accelerator architectures to allow multiple accelerator architectures to communicate directly without involving the host CPU.

JTAG/TAP controller 210 can specify a dedicated debug port implementing a serial communications interface (e.g., a JTAG interface) for low-overhead access to the accelerator without requiring direct external access to the system address and data buses. JTAG/TAP controller 210 can also have on-chip test access interface (e.g., a TAP interface) that implements a protocol to access a set of test registers that present chip logic levels and device capabilities of various parts.

Peripheral interface 212 (such as a PCIe interface), if present, serves as an (and typically the) inter-chip bus, providing communication between the accelerator and other devices.

Bus 214 (such as a I²C bus) includes both intra-chip bus and inter-chip buses. The intra-chip bus connects all internal components to one another as called for by the system architecture. While not all components are connected to every other component, all components do have some connection to other components they need to communicate with. The inter-chip bus connects the accelerator with other devices, such as the off-chip memory or peripherals. For example, bus 214 can provide high speed communication across cores and can also connect cores 202 with other units, such as the off-chip memory or peripherals. Typically, if there is a peripheral interface 212 (e.g., the inter-chip bus), bus 214 is solely concerned with intra-chip buses, though in some implementations it could still be concerned with specialized inter-bus communications.

Accelerator 200 can also communicate with host unit 220. Host unit 220 can be one or more processing unit (e.g., an X86 central processing unit). As shown in FIG. 2A, host unit 220 may be associated with host memory 221. In some embodiments, host memory 221 may be an integral memory or an external memory associated with host unit 220. In some embodiments, host memory 221 may comprise a host disk, which is an external memory configured to provide additional memory for host unit 220. Host memory 221 can be a double data rate synchronous dynamic random-access memory (e.g., DDR SDRAM) or the like. Host memory 221 can be configured to store a large amount of data with slower access speed, compared to the on-chip memory integrated within accelerator chip, acting as a higher-level cache. The data stored in host memory 221 may be transferred to accelerator 200 to be used for executing neural network models.

In some embodiments, a host system having host unit 220 and host memory 221 can comprise a compiler (not shown). The compiler is a program or computer software that transforms computer codes written in one programming language into instructions for accelerator 200 to create an executable program. In machine learning applications, a compiler can perform a variety of operations, for example, pre-processing, lexical analysis, parsing, semantic analysis, conversion of input programs to an intermediate representation, initialization of a neural network, code optimization, and code generation, or combinations thereof. For example, the compiler can compile a neural network to generate static parameters, e.g., connections among neurons and weights of the neurons.

In some embodiments, host system including the compiler may push one or more commands to accelerator 200. As discussed above, these commands can be further processed by command processor 204 of accelerator 200, temporarily stored in an instruction buffer of accelerator 200, and distributed to corresponding one or more cores (e.g., cores 202 in FIG. 2A) or processing elements. Some of the commands may instruct a DMA unit (e.g., DMA unit 208 of FIG. 2A) to load instructions and data from host memory (e.g., host memory 221 of FIG. 2A) into accelerator 200. The loaded instructions may then be distributed to each core (e.g., core 202 of FIG. 2A) assigned with the corresponding task, and the one or more cores may process these instructions.

Figure 2B:
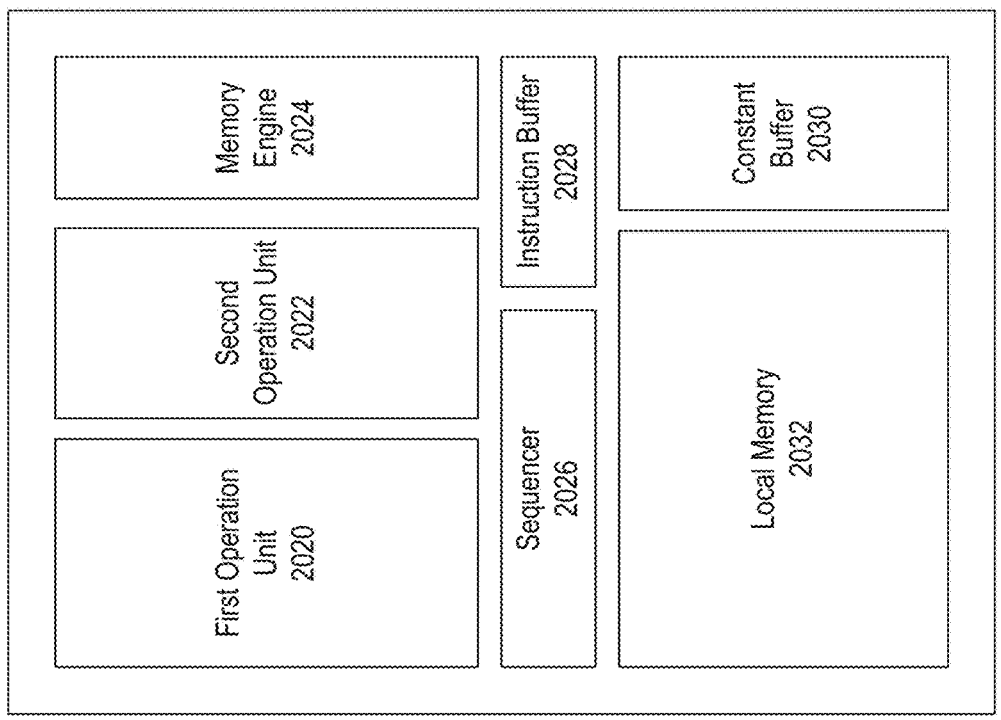
FIG. 2B illustrates an exemplary neural network accelerator core architecture, consistent with some embodiments of the present disclosure.

It is appreciated that the first few instructions received by the cores 202 may instruct the cores 202 to load/store data from host memory 221 into one or more local memories of the cores (e.g., local memory 2032 of FIG. 2B). Each core 202 may then initiate the instruction pipeline, which involves fetching the instruction (e.g., via a sequencer) from the instruction buffer, decoding the instruction (e.g., via a DMA unit 208 of FIG. 2A), generating local memory addresses (e.g., corresponding to an operand), reading the source data, executing or loading/storing operations, and then writing back results.

According to some embodiments, accelerator 200 can further include a global memory (not shown) having memory blocks (e.g., 4 blocks of 8 GB second generation of high bandwidth memory (HBM2)) to serve as main memory. In some embodiments, the global memory can store instructions and data from host memory 221 via DMA unit 208. The instructions can then be distributed to an instruction buffer of each core assigned with the corresponding task, and the core can process these instructions accordingly.

In some embodiments, accelerator 200 can further include memory controller (not shown) configured to manage reading and writing of data to and from a specific memory block (e.g., HBM2) within global memory. For example, memory controller can manage read/write data coming from core of another accelerator (e.g., from DMA unit 208 or a DMA unit corresponding to another accelerator) or from core 202 (e.g., from a local memory in core 202). It is appreciated that more than one memory controller can be provided in accelerator 200. For example, there can be one memory controller for each memory block (e.g., HBM2) within global memory.

Memory controller can generate memory addresses and initiate memory read or write cycles. Memory controller can contain several hardware registers that can be written and read by the one or more processors. The registers can include a memory address register, a byte-count register, one or more control registers, and other types of registers. These registers can specify some combination of the source, the destination, the direction of the transfer (reading from the input/output (I/O) device or writing to the I/O device), the size of the transfer unit, the number of bytes to transfer in one burst, or other typical features of memory controllers.

While accelerator 200 of FIG. 2A can be used for convolutional neural networks (CNNs) in some embodiments of the present disclosure, it is appreciated that accelerator 200 of FIG. 2A can be utilized in various neural networks, such as deep neural networks (DNNs), recurrent neural networks (RNNs), or the like. In addition, some embodiments can be configured for various processing architectures, such as neural network processing units (NPUs), graphics processing units (GPUs), field programmable gate arrays (FPGAs), tensor processing units (TPUs), application-specific integrated circuits (ASICs), any other types of heterogeneous accelerator processing units (HAPUs), or the like.

FIG. 2B illustrates an exemplary core architecture, consistent with embodiments of the present disclosure. As shown in FIG. 2B, core 202 can include one or more operation units such as first and second operation units 2020 and 2022, a memory engine 2024, a sequencer 2026, an instruction buffer 2028, a constant buffer 2030, a local memory 2032, or the like.

One or more operation units can include first operation unit 2020 and second operation unit 2022. First operation unit 2020 can be configured to perform operations on received data (e.g., matrices). In some embodiments, first operation unit 2020 can include one or more processing units configured to perform one or more operations (e.g., multiplication, addition, multiply-accumulate, element-wise operation, etc.). In some embodiments, first operation unit 2020 is configured to accelerate execution of convolution operations or matrix multiplication operations. An example of first operation unit 2020 will be explained with respect to FIG. 3 in detail.

Second operation unit 2022 can be configured to perform a pooling operation, an interpolation operation, a region-of-interest (ROI) operation, and the like. In some embodiments, second operation unit 2022 can include an interpolation unit, a pooling data path, and the like.

Memory engine 2024 can be configured to perform a data copy within a corresponding core 202 or between two cores. DMA unit 208 can assist with copying data within a corresponding core or between two cores. For example, DMA unit 208 can support memory engine 2024 to perform data copy from a local memory (e.g., local memory 2032 of FIG. 2B) into a corresponding operation unit. Memory engine 2024 can also be configured to perform matrix transposition to make the matrix suitable to be used in the operation unit.

Sequencer 2026 can be coupled with instruction buffer 2028 and configured to retrieve commands and distribute the commands to components of core 202. For example, sequencer 2026 can distribute convolution commands or multiplication commands to first operation unit 2020, distribute pooling commands to second operation unit 2022, or distribute data copy commands to memory engine 2024. Sequencer 2026 can also be configured to monitor execution of a neural network task and parallelize sub-tasks of the neural network task to improve efficiency of the execution. In some embodiments, first operation unit 2020, second operation unit 2022, and memory engine 2024 can run in parallel under control of sequencer 2026 according to instructions stored in instruction buffer 2028.

Instruction buffer 2028 can be configured to store instructions belonging to the corresponding core 202. In some embodiments, instruction buffer 2028 is coupled with sequencer 2026 and provides instructions to the sequencer 2026. In some embodiments, instructions stored in instruction buffer 2028 can be transferred or modified by command processor 204.

Constant buffer 2030 can be configured to store constant values. In some embodiments, constant values stored in constant buffer 2030 can be used by operation units such as first operation unit 2020 or second operation unit 2022 for batch normalization, quantization, de-quantization, or the like.

Local memory 2032 can provide storage space with fast read/write speed. To reduce possible interaction with a global memory, storage space of local memory 2032 can be implemented with large capacity. With the massive storage space, most of data access can be performed within core 202 with reduced latency caused by data access. In some embodiments, to minimize data loading latency and energy consumption, SRAM (static random access memory) integrated on chip can be used as local memory 2032. In some embodiments, local memory 2032 can have a capacity of 192 MB or above. According to some embodiments of the present disclosure, local memory 2032 be evenly distributed on chip to relieve dense wiring and heating issues.

Figure 2C:
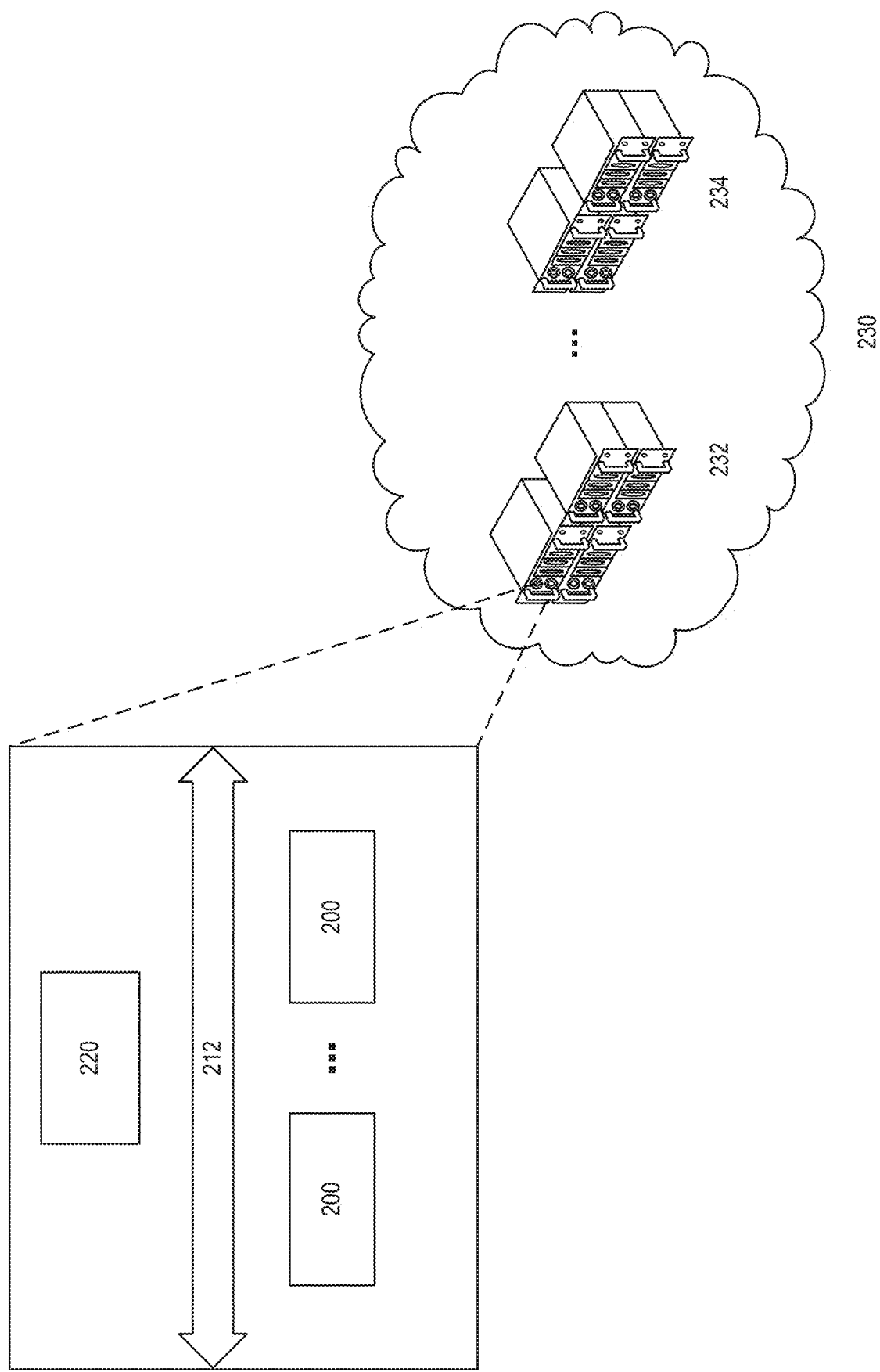
FIG. 2C illustrates a schematic diagram of an exemplary cloud system incorporating a neural network accelerator, consistent with some embodiments of the present disclosure.

FIG. 2C illustrates a schematic diagram of an exemplary cloud system incorporating accelerator 200, consistent with embodiments of the present disclosure. As shown in FIG. 2C, cloud system 230 can provide a cloud service with artificial intelligence (AI) capabilities and can include a plurality of computing servers (e.g., computing servers 232 and 234). In some embodiments, a computing server 232 can, for example, incorporate a neural network accelerator 200 of FIG. 2A. Neural network accelerator 200 is shown in FIG. 2C in a simplified manner for simplicity and clarity.

With the assistance of neural network accelerator 200, cloud system 230 can provide the extended AI capabilities of image recognition, facial recognition, translations, 3D modeling, and the like. It is appreciated that, neural network accelerator 200 can be deployed to computing devices in other forms. For example, neural network accelerator 200 can also be integrated in a computing device, such as a smart phone, a tablet, and a wearable device.

Figure 3:
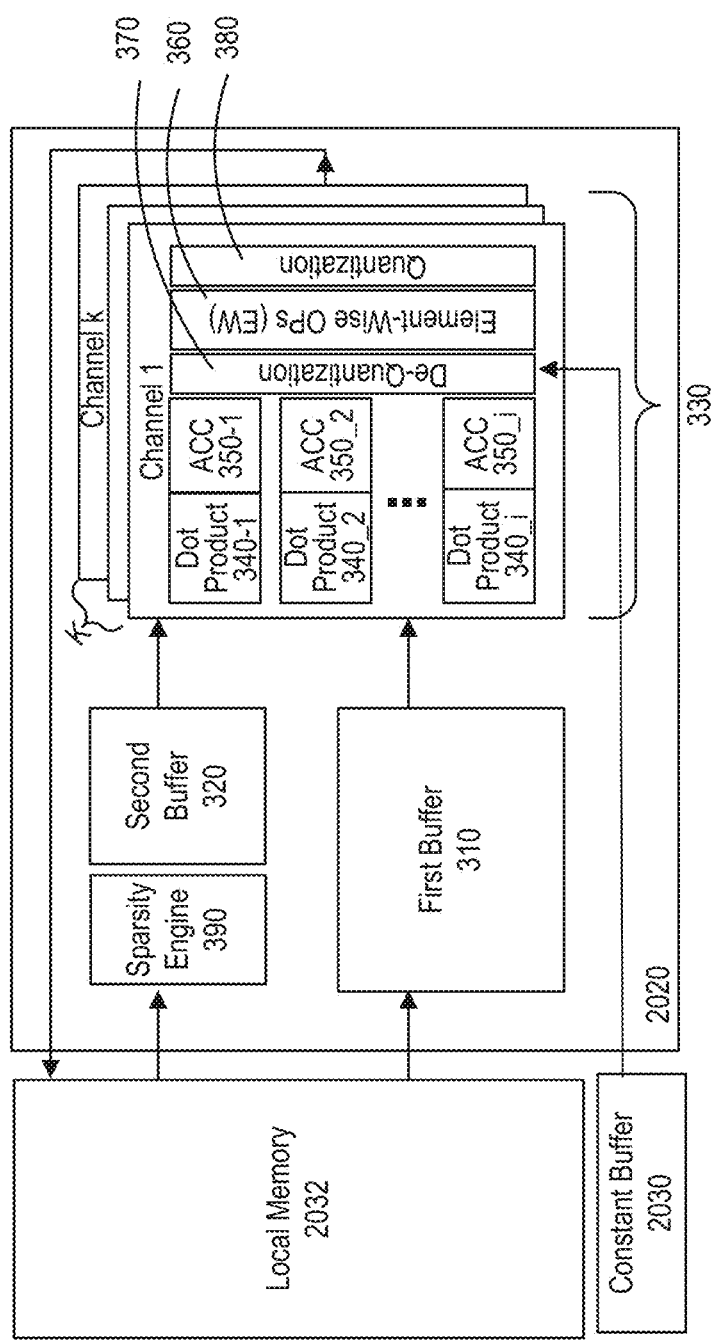
FIG. 3 illustrates an exemplary operation unit configuration, consistent with some embodiments of the present disclosure.

FIG. 3 illustrates an exemplary operation unit configuration, consistent with some embodiments of the present disclosure. According to some embodiments of the present disclosure, an operation unit can be first operation unit 2020 in FIG. 2B. Operation unit 2020 may include a first buffer 310, a second buffer 320, and a processing array 330.

First buffer 310 may be configured to store input data. In some embodiments, data stored in first buffer 310 can be input data to be used in processing array 330 for execution. In some embodiments, the input data can be fetched from local memory (e.g., local memory 2032 in FIG. 2B). First buffer 310 may be configured to support reuse or share of data to be used in processing array 330. In some embodiments, input data stored in first buffer 310 may be activation data for a convolution operation.

Second buffer 320 may be configured to store weight data. In some embodiments, weight data stored in second buffer 320 can be used in processing array 330 for execution. In some embodiments, the weight data stored in second buffer 320 can be fetched from local memory (e.g., local memory 2032 in FIG. 2B). In some embodiments, weight data stored in second buffer 320 may be filter data for a convolution operation. According to some embodiments of the present disclosure, weight data stored in second buffer 320 can be compressed data. For example, weight data can be pruned data to save memory space on chip. In some embodiments, operation unit 2020 can further include a sparsity engine 390. Sparsity engine 390 can be configured to unzip compressed weight data to be used in processing array 330.

Processing array 330 may have a plurality of layers (e.g., K layers). According to some embodiments of the present disclosure, each layer of processing array 330 may include a plurality of processing strings, which may perform computations in parallel. For example, first processing string included in the first layer of processing array 330 can comprise a first multiplier 340_1 and a first accumulator 350_1 and second processing string can comprise a second multiplier 340_2 and a second accumulator 350_2. Similarly, $i^{th}$ processing string in the first layer can comprise an $i^{th}$ multiplier 340_i and an $i^{th}$ accumulator 350_i.

In some embodiments, processing array 330 can perform computations under SIMD control. For example, when performing a convolution operation, each layer of processing array 330 can execute same instructions with different data.

According to some embodiments of the present disclosure, processing array 330 shown in FIG. 3 can be included in a core (e.g., core 202 in FIG. 2A and FIG. 2B). When a number of processing strings (e.g., i number of processing strings) included in one layer of processing array 330 is smaller than a number of work items (e.g., B number of work items), i number of work items can be executed by processing array 330 and subsequently the rest of work items (B-i number of work items) can be executed by the processing array 330 in some embodiments. In some other embodiments, i number of work items can be executed by processing array 330 and the rest of work items can be executed by another processing array 330 in another core.

According to some embodiments of the present disclosure, processing array 330 may further include an element-wise operation processor 360. In some embodiments, element-wise operation processor 360 can be positioned at the end of processing strings. In some embodiments, processing strings in each layer of processing array 330 can share element-wise operation processor 360. For example, i number of processing strings in the first layer of processing array 330 can share element-wise operation processor 360. In some embodiments, element-wise operation processor 360 in the first layer of processing array 330 can perform its element-wise operation on each of output values, from accumulators 350_1 to 350_i, sequentially. Similarly, element-wise operation processor 360 in the $K^{th}$ layer of processing array 330 can perform its element-wise operation on each of output values, from accumulators 350_1 to 350_i, sequentially. In some embodiments, element-wise operation processor 360 can be configured to perform a plurality of element-wise operations. In some embodiments, element-wise operation performed by the element-wise operation processor 360 may include an activation function such as ReLU function, Leaky ReLU function, Sigmoid function, Tanh function, or the like.

In some embodiments, multiplier 340 or accumulator 350 may be configured to perform its operation on different data type from what the element-wise operation processor 360 performs its operations on. For example, multiplier 340 or accumulator 350 can be configured to perform its operations on integer type data such as Int 8, Int 16, and the like and element-wise operation processor 360 can perform its operations on floating point type data such as FP24, and the like. Therefore, according to some embodiments of the present disclosure, processing array 330 may further include de-quantizer 370 and quantizer 380 with element-wise operation processor 360 positioned therebetween. In some embodiments, batch normalization operations can be merged to de-quantizer 370 because both de-quantizer 370 and batch normalization operations can be performed by multiplication operations and addition operations with constants, which can be provided from constant buffer 2030. In some embodiments, batch normalization operations and de-quantization operations can be merged into one operation by compiler. As shown in FIG. 3, constant buffer 2030 can provide constants to de-quantizer 370 for de-quantization or batch normalization.

In the present disclosure, an image can be a digital image. A digital image is an image composed of picture elements, also known as pixels, each with finite, discrete quantities of numeric representation for its intensity or gray level. In the present disclosure, an image can be a picture constituting a video that is a set of static pictures (or "frames") arranged in a temporal sequence. For reducing a storage space, transmission bandwidth, etc., the image can be compressed before storage and transmission and decompressed to be displayed. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Image compression and decompression can be implemented by various algorithms or standards, such as JPEG (Joint Photographic Experts Group), JPEG-2000, BPG (Big Picture Group), or the like. In some applications, the codec can decompress the image from a first coding standard and re-compress the decompressed video using a second coding standard, in which case the codec can be referred to as a "transcoder."

The image encoding process can identify and keep useful information that can be used to reconstruct an image and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

Figure 4A:
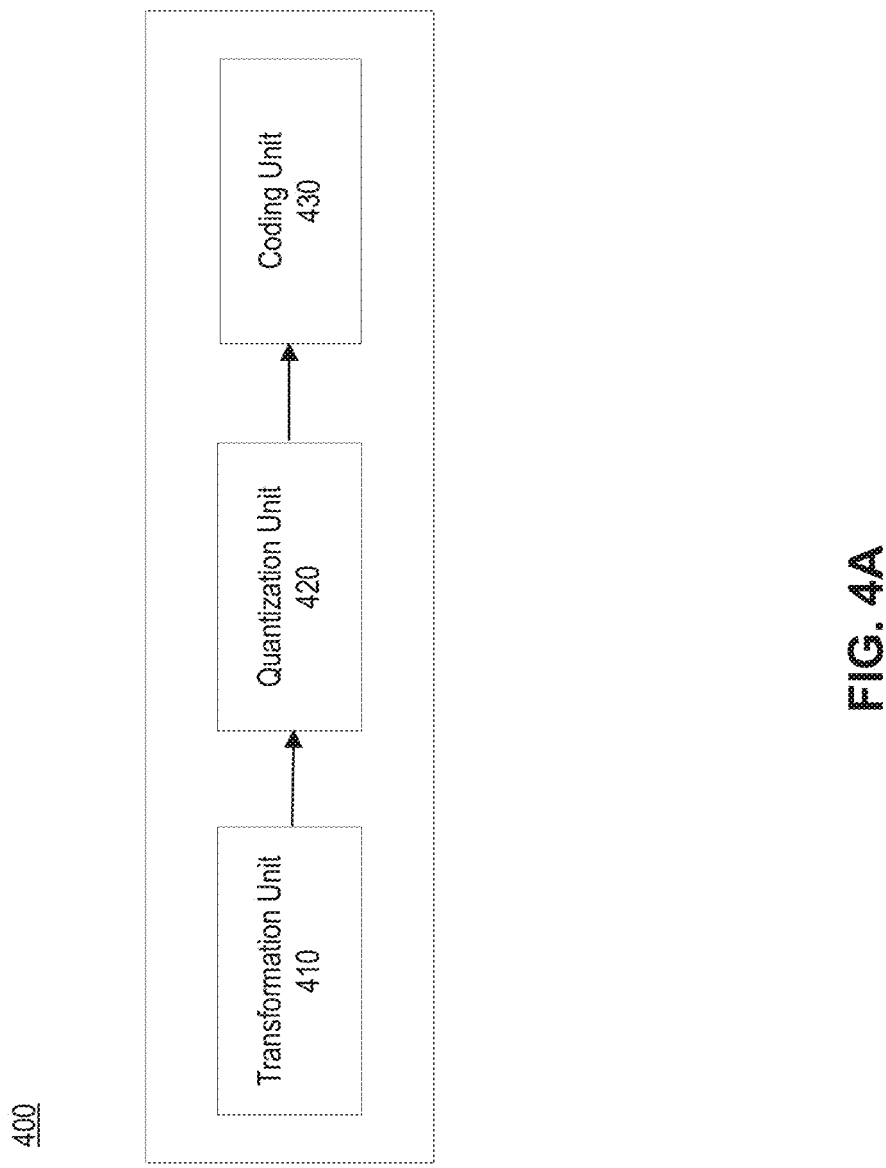
FIG. 4A illustrates a block diagram of an exemplary image compressing apparatus, consistent with some embodiments of the present disclosure.

FIG. 4A illustrates a block diagram of an exemplary image compressing apparatus, consistent with some embodiments of the present disclosure. In some embodiments, image compressing apparatus 400 may comprise transformation unit 410, quantization unit 420, and coding unit 430. In some embodiments, at least part of image compressing apparatus can be implemented by an encoder. In some embodiments, image compressing apparatus 400 can be implemented as any of a variety of suitable hardware, software, or a combination thereof. For example, the hardware implementation of image compressing apparatus 400 can include circuitry, such as one or more microprocessors, digital signal processors (DSPs), application-specific integrated circuits (ASICs), field-programmable gate arrays (FPGAs), discrete logic, or any combinations thereof. The software implementation of image compressing apparatus 400 can include program codes, computer-executable instructions, firmware, or any suitable computer-implemented algorithm or process fixed in a computer-readable medium.

Figure 5A:
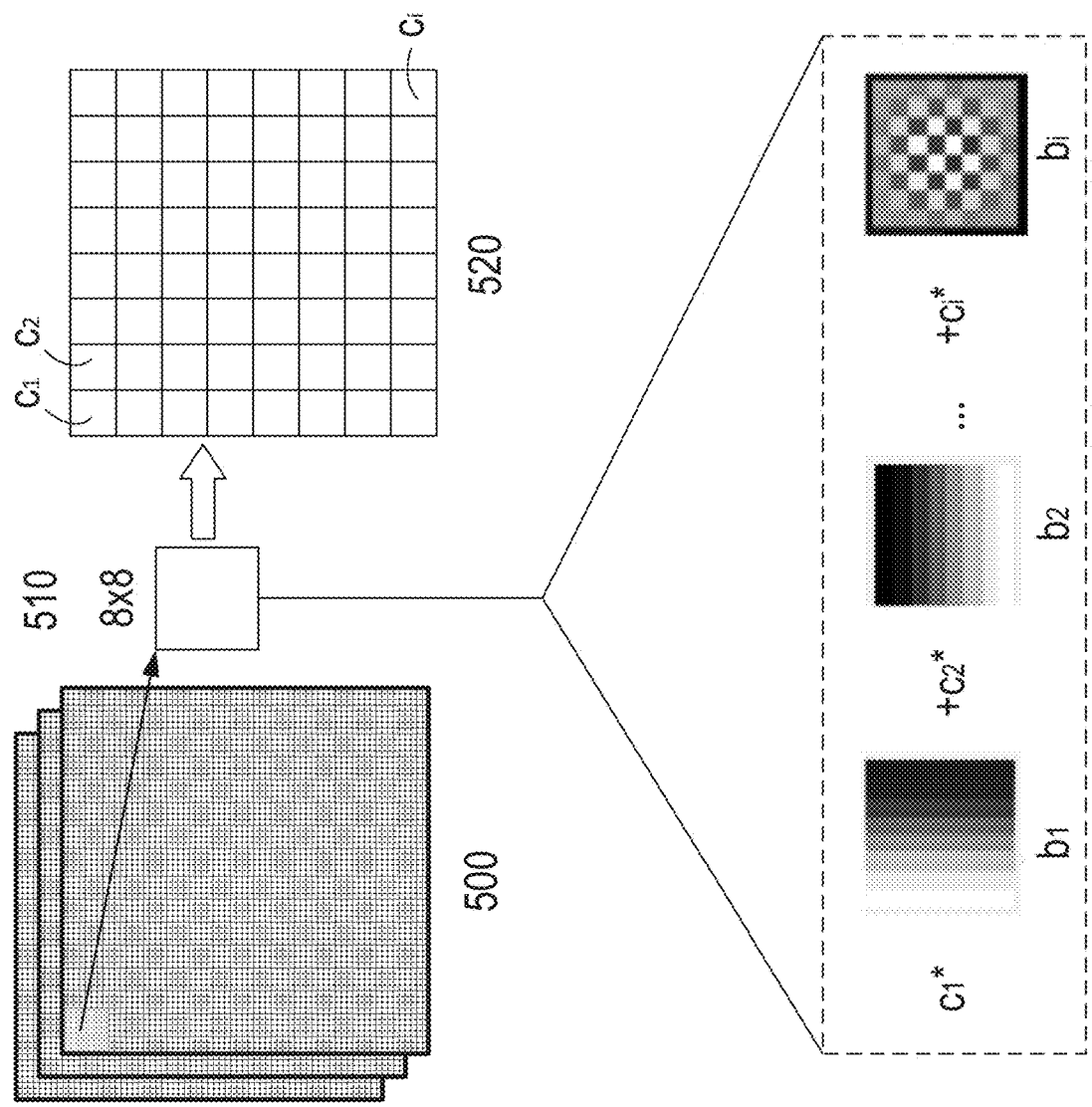
FIG. 5A illustrates an example transformation process, consistent with some embodiments of the present disclosure.

Transformation unit 410 can be configured to transform an image from a spatial domain (e.g., two-dimensional domain) into a frequency domain. Functions of transformation unit 410 will be explained referring to FIG. 5A, which illustrates an example transformation process, consistent with some embodiments of the present disclosure. It will be noted that image 500 of FIG. 5A is an image in a spatial domain. As shown in FIG. 5A, image 500 can be partitioned into basic blocks before transformed into a frequency domain. Such basic blocks are referred to as basic processing units ("BPUs") in the present disclosure. For example, in FIG. 5A, image 500 has size 256×256 and is divided into BPUs having size 8×8, one BPU 510 is indicated as a shaded box in image 500. In this example, image 500 can be partitioned into 1024 BPUs. The BPUs 510 can have variable sizes, such as 128×128, 64×64, 32×32, 16×16, 4×8, 16×32, 4×4 or any arbitrary shape and size of pixels. The sizes and shapes of the BPUs 510 can be selected for an image based on the balance of coding efficiency and levels of details to be kept in the basic processing unit. In FIG. 5A, image 500 is illustrated as having three channels as an example. While some embodiments are explained with respect to one channel, it will be appreciated that image compression and frequency compensation of some embodiments of the present disclosure may be applicable to each channel independently or to multiple channels integrally.

As shown in FIG. 5A, BPUs 510, by transformation unit 410, can be decomposed into a set of two-dimensional "basis functions $b_1, b_2, \ldots, b_i$," each basis function $b_i$ being associated with a "transform coefficient $c_1, c_2, \ldots, c_i$." As shown in FIG. 5A, each BPU 510 can be represented by a combination of basis functions. For example, $X_k = c_{1k} * b_1 + c_{2k} * b_2 + \ldots + c_{ik} * b_i$, where $X_k$ represents $k^{th}$ BPU 510. Different BPUs 510 can have a different combination of transform coefficients and basis functions. The basis functions $b_i$ can represent basis pattern having the same size as BPU 510. Each basis function $b_i$ can represent a variation frequency (e.g., frequency of brightness variation) component of BPU 510. None of the basis functions $b_i$ can be reproduced from any combinations (e.g., linear combinations) of any other basis function. In other words, the transformation can decompose variations of BPU 510 into a frequency domain. Such a decomposition is analogous to a discrete Fourier transform of a function, in which the basis functions $b_i$ are analogous to basis functions (e.g., trigonometry functions) of the discrete Fourier transform, and the transform coefficients $c_i$ are analogous to the coefficients associated with the basis functions.

Different transform algorithms can use different basis functions $b_i$. Various transform algorithms can be used, such as, for example, a discrete cosine transform, a discrete sine transform, or the like. According to some embodiments of the present disclosure, given a known size of BPU 510 (e.g., 8×8), basis functions $b_i$ can be precomputed and stored. In some embodiments where a discrete cosine transform is used as a transform algorithm, two-dimensional transform matrix 520 of BPU 510 that is represented as an M×N matrix A can be defined as follows:

$$C_{pq} = a_p a_q \sum_{m=0}^{M-1} \sum_{n=0}^{N-1} A_{mn} \cos \frac{\pi(2m+1)p}{2M} \cos \frac{\pi(2n+1)p}{2N} \quad \text{(Equation 1)}$$

Where $0 \leq p \leq M-1, 0 \leq q \leq N-1$ $$a_p = \begin{cases} \frac{1}{\sqrt{M}}, & p = 0 \\ \sqrt{2/M}, & 1 \leq p \leq M-1 \end{cases},$$

$$a_q = \begin{cases} \frac{1}{\sqrt{N}}, & q = 0 \\ \sqrt{2/N}, & 1 \leq q \leq N-1 \end{cases}.$$

Here, $A_{mn}$ represents a value of an element at m+1$^{th}$ row and n+1$^{th}$ column of matrix A. Values $C_{pq}$ are called transform coefficients of matrix A and $C_{pq}$ represents a value at p+1$^{th}$ row and q+1$^{th}$ column of transform matrix 520. In this transform algorithm, basis function $b_i$ can be represented as follows:

$$a_p a_q \cos \frac{\pi(2m+1)p}{2M} \cos \frac{\pi(2m+1)q}{2N}, \quad \text{(Equation 2)}$$

$$(0 \leq p \leq M-1, 0 \leq q \leq N-1).$$

As shown in Equations 1 and 2, the discrete cosine transform (DCT) represents an image as sum of sinusoids of varying magnitudes and frequencies.

As shown in FIG. 5A, transform coefficients $c_i$ (i.e., $C_{pq}$ in Equation 1) are elements of transform matrix 520 and thus each element of transform matrix 520 represents an amount of a certain frequency component in corresponding BPU 510. In this example, 64 basis functions are used for transformation and thus transform matrix 520 of size 8×8 can be generated by transformation of BPU 510. According to some embodiments of the present disclosure, transformation can be performed to all BPUs 510 of image 500.

The transform is invertible. That is, BPU 510 can be restored by an inverse operation of the transform (referred to as an "inverse transform"). For example, to restore a pixel of BPU 510, the inverse transform can be multiplying values of corresponding pixels of the base functions $b_i$ by respective associated coefficients $c_i$ and adding the products to produce a weighted sum. For an image coding standard, both an encoder and decoder can use the same transform algorithm (thus the same basis functions $b_i$). Thus, an encoder can record only the transform coefficients, from which the decoder can reconstruct BPU 510 without receiving the basis functions $b_i$ from the encoder. Compared with BPU 510, the transform coefficients can have fewer bits, but they can be used to reconstruct BPU 510 without significant quality deterioration. Thus, BPU 510 can be compressed by transformation.

Referring back to FIG. 4A, quantization unit 420 is configured to quantize transform coefficients $c_i$ of transform matrix (e.g., transform matrix 520 of FIG. 5A). According to some embodiments of the present disclosure, quantization unit 420 can further compress the image 500 by quantizing transform coefficients $c_i$ of transform matrix 520. In some embodiments, quantization unit 420 can generate quantized transform coefficients by dividing each transform coefficient $c_i$ by an integer value (referred to as a "quantization parameter") and rounding the quotient to its nearest integer. After such an operation, some transform coefficients $c_i$ of some frequency components can be converted to zero, and the transform coefficients of some other frequency components can be converted to smaller integers. The zero-value quantized transform coefficients can be disregarded during encoding, by which the transform coefficients $c_i$ are further compressed. The quantization process is also invertible, in which quantized transform coefficients can be reconstructed to the transform coefficients $c_i$ in an inverse operation of the quantization (referred to as "inverse quantization").

Because the remainders of such divisions in the rounding operation are disregarded, the quantization process can be lossy. Typically, the quantization process can contribute the most information loss in the encoding process. The larger the information loss is, the fewer bits the quantized transform coefficients $c_i$ can need. For obtaining different levels of information loss, different values of the quantization parameter or any other parameter of the quantization process can be used.

In some embodiments, quantization unit 420 can use a default quantization table that defines default quantization parameters for each frequency component. Because human eyes are generally better at recognizing low-frequency variation, information of high-frequency variation may be disregarded without causing significant quality deterioration in decoding. Therefore, a default quantization table may comprise default quantization parameters that are predetermined such that one or more higher frequency components (e.g., the top 55 frequency components when there are 64 frequency components) are discarded while reserving lower frequency components (e.g., the bottom 9 frequency components when there are 64 frequency components). For most images, much of the signal energy lies at lower frequencies and thus values of lower frequency components are much larger than those of higher frequency components. Accordingly, it may be difficult to obtain a higher degree of compression by removing only higher frequency components. According to some embodiments of the present disclosure, an efficient image compression scheme can be provided by dynamically generating quantization table for each image. According to some embodiments of the present disclosure, a high compression rate of an image can be obtained by selectively removing one or more frequency components including a lower frequency component.

Figure 4B:
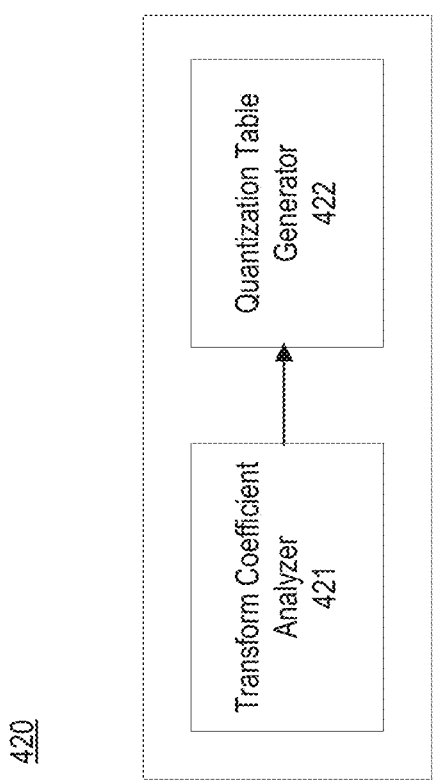
FIG. 4B illustrates a block diagram of a quantization unit of FIG. 4A, consistent with some embodiments of the present disclosure.

FIG. 4B illustrates a block diagram of quantization unit 420 of FIG. 4A, consistent with some embodiments of the present disclosure. As shown in FIG. 4B, quantization unit 420 may comprise transform coefficients analyzer 421 and quantization table generator 422.

Figure 5B:
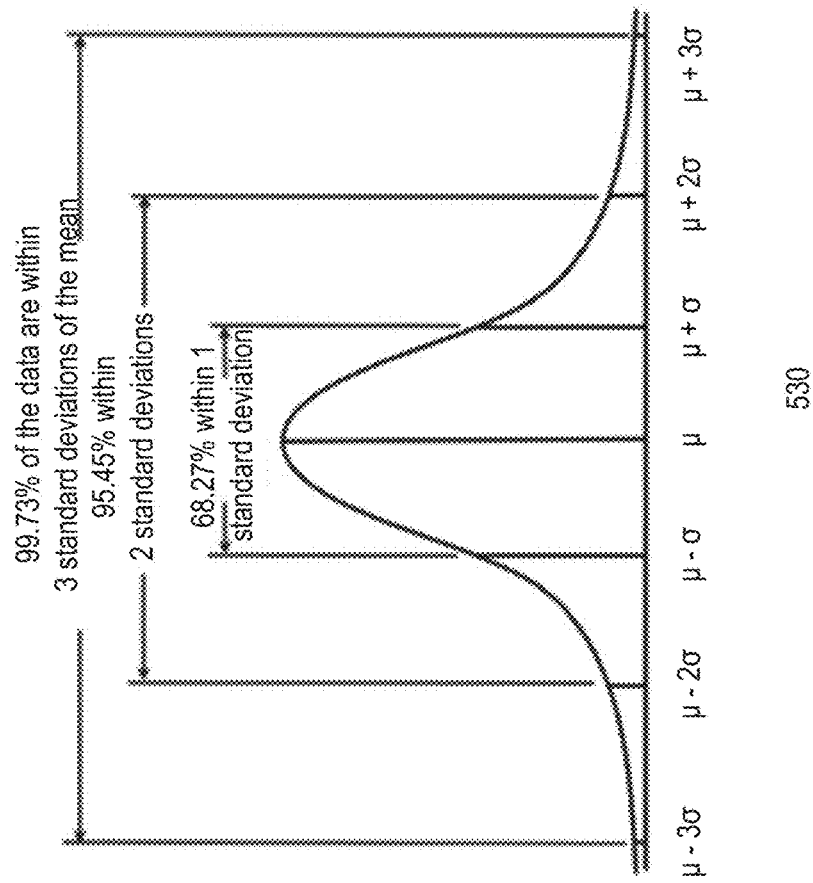
FIG. 5B illustrates an example transform coefficient distribution, consistent with some embodiments of the present disclosure.
Figure 5B:
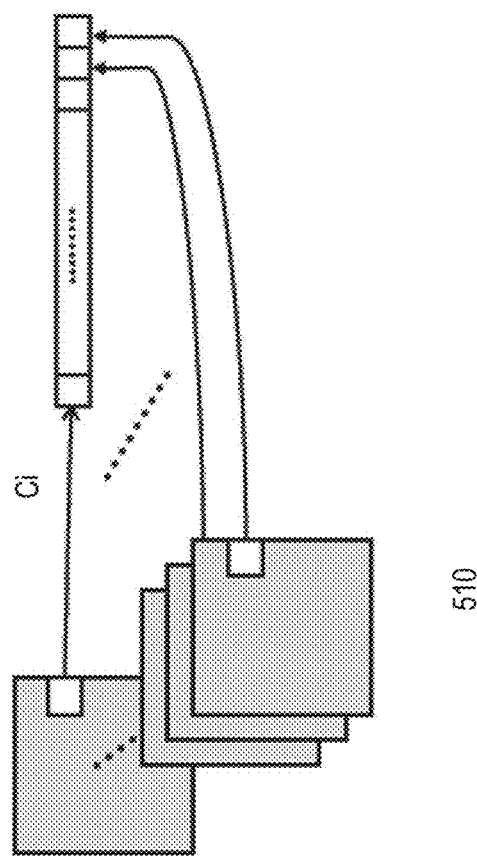

Transform coefficients analyzer 421 is configured to estimate distributions of transform coefficients $c_i$. In some embodiments, transform coefficients analyzer 421 can estimate a standard deviation value for each transform coefficient $c_i$ of image 500. FIG. 5B illustrates an example transform coefficient distribution. As shown in FIG. 5B, transform coefficient analyzer 421 can collect transform coefficients $c_i$ for each frequency component from all BPUs 510 of image 500. In this example, 1024 transform coefficients $c_i$ for each frequency component can be acquired because 1024 transform matrices 520 are generated from 1024 BPUs 510. Transform coefficient analyzer 421 can estimate a distribution of frequency component $c_i$. In some embodiments, transform coefficient $c_i$ may have normal distribution 530 that may be based on the following equation:

$$f(c_i) = \frac{1}{\sigma\sqrt{2\pi}} e^{-\frac{1}{2}\left(\frac{c_i-\mu}{\sigma}\right)^2}. \qquad \text{(Equation 3)}$$

Here, parameter $\mu$ represents a mean value of transform coefficient $c_i$ and parameter $\sigma$ represents a standard deviation value of the transform coefficient ci. As shown in FIG. 5B, for normal distribution 530, the values less than one standard deviation $\sigma$ away from the mean $\mu$ account for 68.27% of the set, two standard deviations from the mean account for 95.45%, and three standard deviations account for 99.73%. In some embodiments, transform coefficient analyzer 421 can estimate a standard deviation value $\sigma$ of transform coefficient $c_i$ e.g., by estimating Equation 3 that fits a distribution of transform coefficient $c_i$ or by estimating, from a distribution of transform coefficient $c_i$, a distance from the mean value, which accounts for 68.27% of the set. According to some embodiments, transform coefficient analyzer 421 utilizes statistical information when estimating a transform coefficient distribution and standard deviation value $\sigma$ thereof.

Figure 5C:
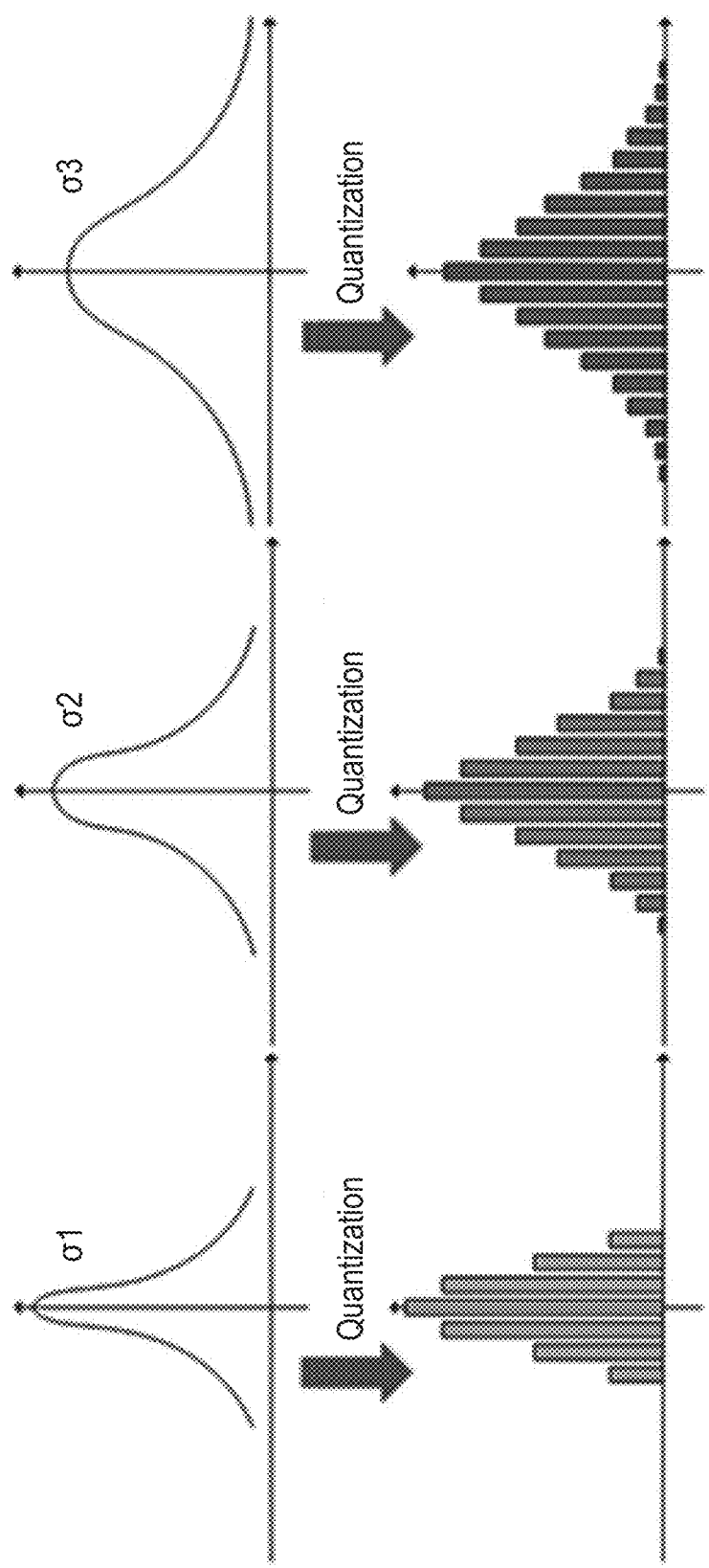
FIG. 5C illustrates an example relationship between a standard deviation value of a transform coefficient distribution and a compression rate.

FIG. 5C illustrates an example relationship between a standard deviation value of a transform coefficient distribution and a compression rate where $\sigma 1 < \sigma 2 < \sigma 3$. As shown in FIG. 5C, the greater standard deviation $\sigma$ is, the more bits to represent data are needed after quantization under an assumption that a same quantization parameter is applied. Therefore, when a greater quantization parameter is used for a certain frequency component of which standard deviation $\sigma$ is larger, a compression rate can be increased.

Figure 5D:
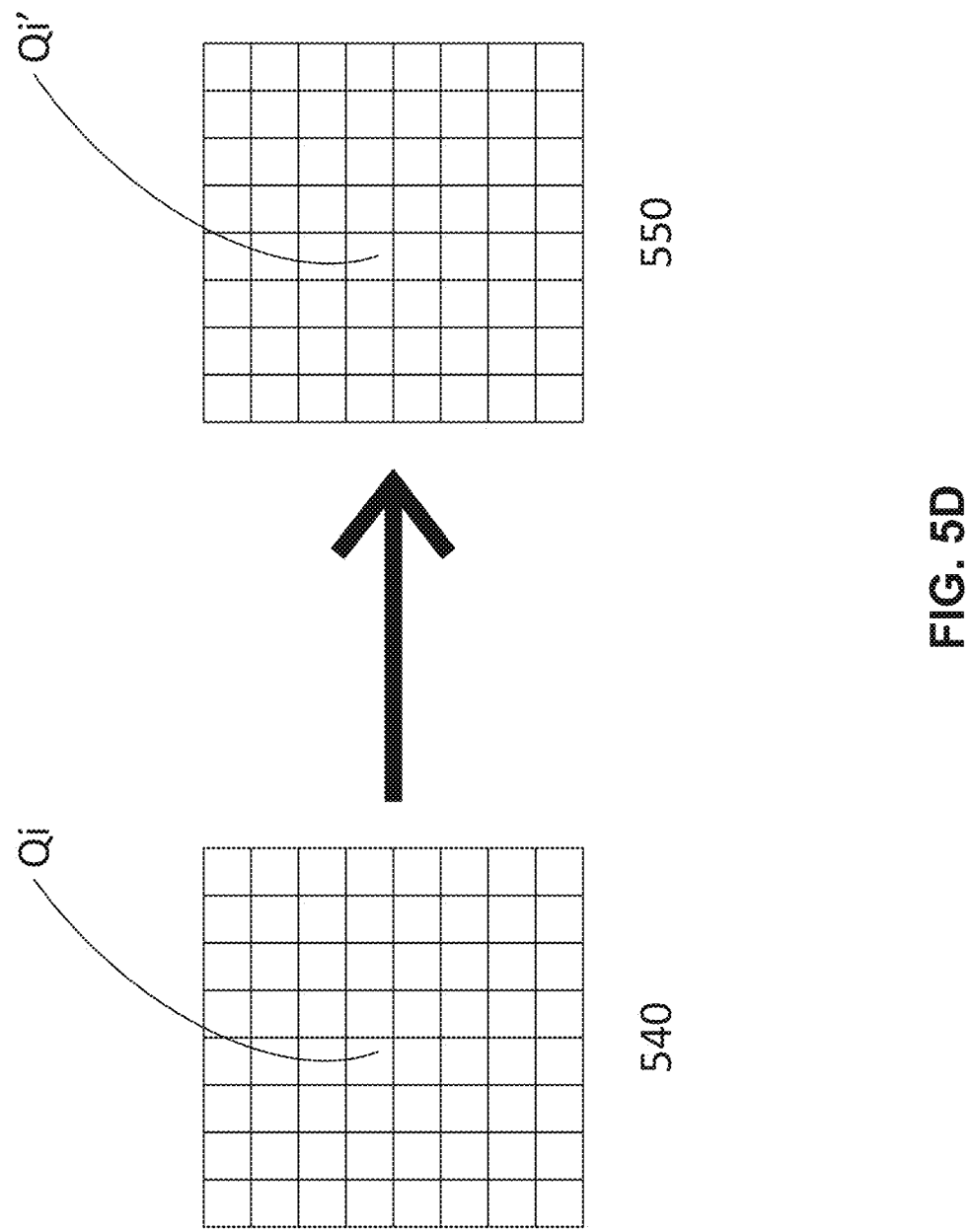
FIG. 5D illustrates an example process for generating a quantization table, consistent with some embodiments of the present disclosure.

Referring back to FIG. 4B, quantization table generator 422 can generate a quantization table for image 500 based on a default quantization table and transform coefficient distributions. FIG. 5D illustrates an example process for generating a quantization table, consistent with some embodiments of the present disclosure. In some embodiments, quantization table generator 422 can generate quantization table 550 based on default quantization table 540 and can transform coefficient distributions. In some embodiments, quantization table generator 422 compares standard deviation $\sigma_i$ with default quantization parameter $Q_i$ in default quantization table 540 for a certain frequency component. When standard deviation $\sigma_i$ is greater than default quantization parameter $Q_i$, quantization table generator 422 is configured to replace the default quantization parameter $Q_i$ with the standard deviation $\sigma_i$ in quantization table 550. In this case, the standard deviation $\sigma_i$ becomes quantization parameter $Q_i'$ in adjusted quantization table 550. When standard deviation $\sigma_i$ is equal to or less than default quantization parameter $Q_i$ in quantization table 540, the default quantization parameter $Q_i$ is reserved in adjusted quantization table 550. According to some embodiments, all quantization parameters for all frequency components of default quantization table 540 can be updated to generate adjusted quantization table 550 for image 500. In some embodiments, quantization table generator 422 can generate adjusted quantization table 550 such that a certain frequency component (e.g., including a lower frequency component) can be removed by quantization.

Referring back to FIG. 4A, quantization unit 420 can perform quantization of transform coefficients $c_i$ of BPUs 510 by using adjusted quantization table 550 generated for image 500. In some embodiments, because adjusted quantization table 550 can be generated per image, quantization unit 420 can quantize transform coefficients $c_i$ for all BPUs 510 of image 500 based on the adjusted quantization table 550.

Coding unit 430 is configured to encode quantized transform coefficients using a binary coding technique, such as, for example, entropy coding, variable length coding, arithmetic coding, Huffman coding, context-adaptive binary arithmetic coding, or any other lossless or lossy compression algorithm. In some embodiments, besides quantized transform coefficients, coding unit 430 can encode other information, such as, for example, a transform type used in transformation unit 410, parameters (e.g., quantization parameters) used in quantization unit 420, an encoder control parameter (e.g., a bitrate control parameter), or the like. The coding unit 430 can generate bitstream from coded output data. In some embodiments, image bitstream can be further packetized for network transmission.

Figure 6:
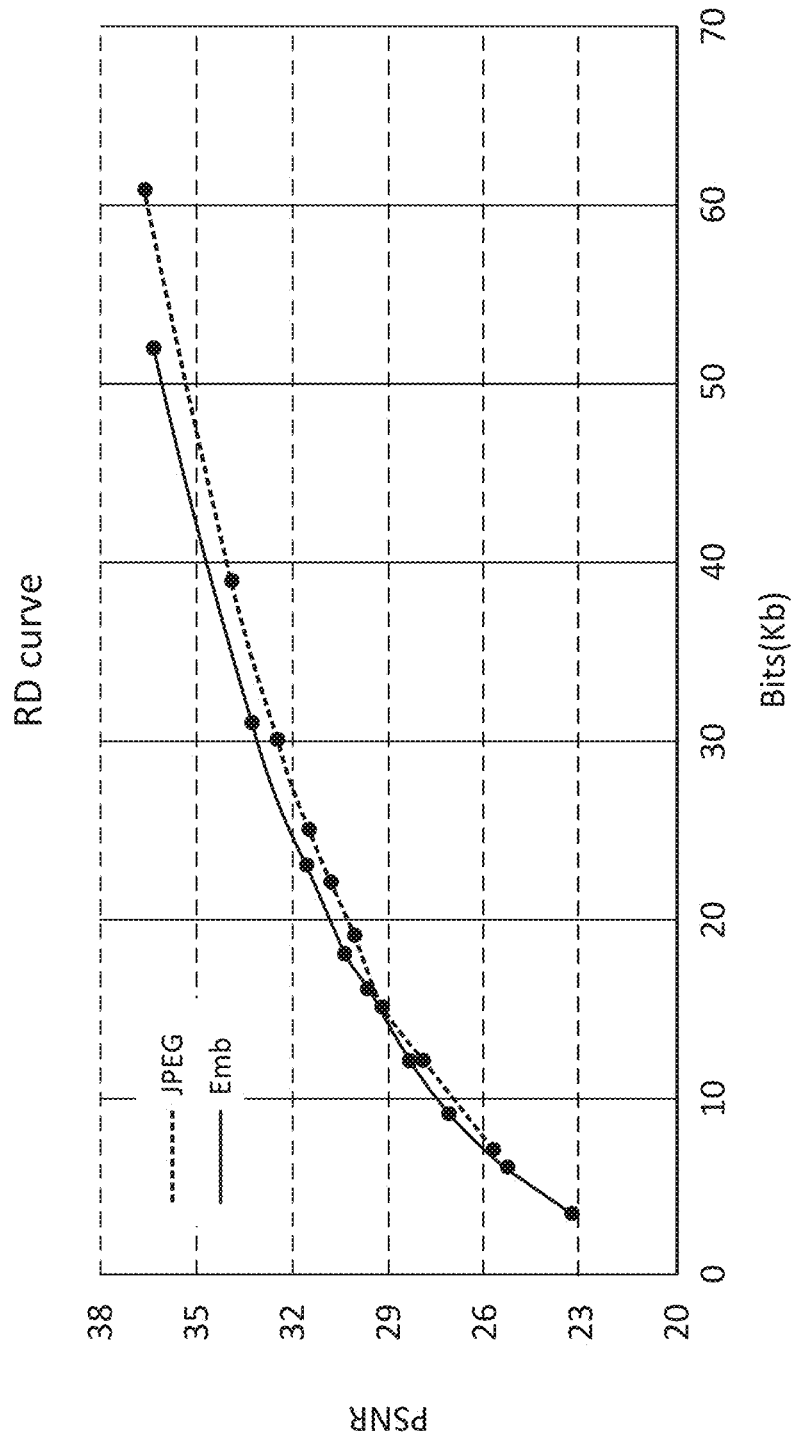
FIG. 6 illustrates an example performance comparison between a conventional technology and an embodiment of the present disclosure.

FIG. 6 illustrates an example performance comparison between a conventional technology and an embodiment of the present disclosure. In FIG. 6, JPEG represents a conventional technology where a default quantization table (e.g., 540 in FIG. 5D) is used and Emb represents an embodiment of the present disclosure where adjusted quantization table (e.g., 550 in FIG. 5D) is used when compression. Bits represent the number of bits used to represent compressed image and can indicate a compression rate. For example, fewer bits are needed to represent image 500 when a compression rate is high. PSNR represents a peak signal to noise ratio and can indicate quality of a reconstructed image. For example, higher PSNR can indicate higher image quality. As shown in FIG. 6, Emb generally shows higher PSNR than JPEG when an equal number of bits are used except a small section (e.g., where the number of bits are equal to or less than 25 bits), which means Emb can provide a reconstructed image of higher quality than JPEG when an equal compression rate is applied.

According to some embodiments of the present disclosure, because, when standard deviation $\sigma_i$ for a certain frequency component is larger, a greater quantization parameter (e.g., standard deviation $\sigma_i$) can be applied for quantization, a compression rate can be increased. According to some embodiments of the present disclosure, quantization parameter $Q_i$ is dynamically adjusted based on standard deviation $\sigma_i$ for a certain frequency component and a constant compression rate can be achieved regardless of transform coefficient distribution variations. According to some embodiments of the present disclosure, a certain frequency component(s) can be selectively removed by dynamically adjusting quantization parameters when compressing, which leads a high compression rate.

Figure 7:
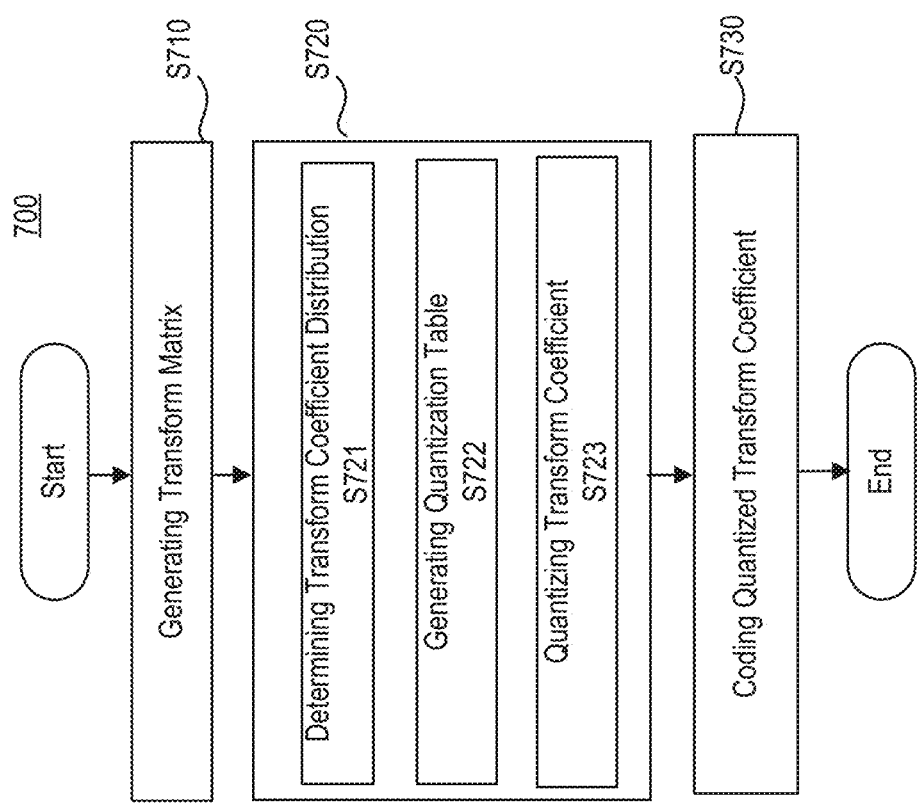
FIG. 7 illustrates an exemplary flow diagram for an example image compressing method, consistent with some embodiments of the present disclosure.

FIG. 7 illustrates an exemplary flow diagram for an example image compressing method, consistent with some embodiments of the present disclosure. For illustrative purposes, image compressing method 700 will be described referring to compressing apparatus 400 of FIG. 4A and quantization unit 420 of FIG. 4B.

In step S710, transform matrices 520 for BPUs 510 of image 500 are generated. Step S710 can be performed by, for example, transformation unit 410, among others. In some embodiments, image 500 can be converted from a spatial domain (e.g., two-dimensional domain) to a frequency domain. In some embodiments, image 500 is partitioned into BPUs 510. As shown in FIG. 5A, BPUs 510 are decomposed into a set of two-dimensional "basis functions $b_1, b_2, \ldots, b_i$," each basis function $b_i$ being associated with a "transform coefficient $c_1, c_2, \ldots, c_i$." As shown in FIG. 5A, each BPU 510 can be represented by a combination of basis functions. For example, $X_k = c_{1k}*b_1 + c_{2k}*b_2 + \ldots + c_{ik}*b_i$, where $X_k$ represents $k^{th}$ BPU 510. Different BPUs 510 can have a different combination of transform coefficients and basis functions. The basis functions $b_i$ can represent basis pattern having the same size as BPU 510. Each basis function $b_i$ can represent a variation frequency (e.g., frequency of brightness variation) component of BPU 510.

Different transform algorithms can use different basis functions $b_i$. Various transform algorithms can be used, such as, for example, a discrete cosine transform, a discrete sine transform, or the like. According to some embodiments of the present disclosure, given a known size of BPU 510 (e.g., 8×8), basis functions $b_i$ can be precomputed and stored.

As shown in FIG. 5A, transform coefficients $c_i$ are elements of transform matrix 520 and thus each element of transform matrix 520 represents an amount of a certain frequency component in corresponding BPU 510. In this example, 64 basis functions are used for transformation and thus transform matrix 520 of size 8×8 can be generated by transformation of BPU 510. According to some embodiments of the present disclosure, transformation can be performed to all BPUs 510 of image 500.

In step S720, transform coefficients of image 500 are quantized. Step S720 can be performed by, for example, quantization unit 420, among others. According to some embodiments of the present disclosure, step S720 can be performed by three sub-steps S721, S722, and S723.

In sub-step S721, transform coefficient distributions of image 500 can be determined. Sub-step S721 can be performed by, for example, transform coefficient analyzer 421, among others. In some embodiments, distributions of transform coefficients $c_i$ are estimated. In some embodiments, a standard deviation value for each transform coefficient $c_i$ of image 500 can be estimated. As shown in FIG. 5B, transform coefficients $c_i$ for each frequency component can be collected from all BPUs 510 of image 500. A distribution of frequency component $c_i$ can be estimated based on collected transform coefficients $c_i$. In some embodiments, transform coefficient $c_i$ may have normal distribution 530 represented Equation 3. In some embodiments, standard deviation value σ of transform coefficient $c_i$ can be estimated e.g., by estimating Equation 3 that fits a distribution of transform coefficient $c_i$ or by estimating, from a distribution of transform coefficient $c_i$, a distance from the mean value, which accounts for 68.27% of the set. According to some embodiments, statistical information can be utilized when estimating a transform coefficient distribution and standard deviation value σ thereof.

In sub-step S722, a quantization table is generated for image 500. Sub-step S722 can be performed by, for example, quantization table generator 422, among others. In some embodiments, a quantization table for image 500 can be generated based on a default quantization table and transform coefficient distributions. In some embodiments, standard deviation $σ_i$ of transform coefficient $c_i$ is compared with default quantization parameter $Q_i$ in default quantization table 540 for a certain frequency component. When standard deviation $σ_i$ is greater than default quantization parameter $Q_i$, the default quantization parameter $Q_i$ is replaced with the standard deviation $σ_i$ in quantization table 550. In this case, the standard deviation $σ_i$ becomes quantization parameter $Q_i'$ in adjusted quantization table 550. When standard deviation $σ_i$ is equal to or less than default quantization parameter $Q_i$ in quantization table 540, the default quantization parameter $Q_i$ is reserved in adjusted quantization table 550. According to some embodiments, all quantization parameters for all frequency components of default quantization table 540 can be updated to generate adjusted quantization table 550 for image 500. In some embodiments, adjusted quantization table 550 can be generated such that a certain frequency component (e.g., including a lower frequency component) can be removed by quantization.

In sub-step S723, transform coefficients $c_i$ of image 500 are quantized based on adjusted quantization table 550 generated in sub-step S722. Sub-step S723 can be performed by, for example, quantization unit 420, among others. In some embodiments, because adjusted quantization table 550 can be generated per image, transform coefficients $c_i$ for all BPUs 510 of image 500 can be quantized based on the adjusted quantization table 550.

In some embodiments, quantized transform coefficients can be generated by dividing each transform coefficient $c_i$ by quantization parameter in adjusted quantization table 550 and rounding the quotient to its nearest integer. After such an operation, some transform coefficients $c_i$ of some frequency components can be converted to zero, and the transform coefficients of some other frequency components can be converted to smaller integers. The zero-value quantized transform coefficients can be disregarded during encoding, by which the transform coefficients $c_i$ are further compressed.

In step S730, quantized transform coefficients are coded. Step S730 can be performed by, for example, coding unit 430, among others. In some embodiments, quantized transform coefficients can be encoded using a binary coding technique, such as, for example, entropy coding, variable length coding, arithmetic coding, Huffman coding, context-adaptive binary arithmetic coding, or any other lossless or lossy compression algorithm. In some embodiments, besides quantized transform coefficients, other information, such as, for example, a transform type used in step S710, parameters (e.g., quantization parameters) used in S720, an encoder control parameter (e.g., a bitrate control parameter), or the like can be encoded. In some embodiments, bitstream can be generated from coded output data. In some embodiments, image bitstream can be further packetized for network transmission.

Machine learning or deep learning has been widely used in various areas and applications of neural networks have been extended to image processing. Current filter-based machine learning algorithms focus on image denoising to remove artifacts. That is, machine learning-based methods are generally engaged in reducing artifact issues and show promising performance in those issues. However, such machine learning-based approaches may require very large and complex DNN (deep neural network) model (e.g., greater than 100 layers) because they try to recover all frequency information. According to some embodiments of the present disclosure, an efficient machine learning-based image compensation scheme can be provided. According to some embodiments of the present disclosure, a specific frequency component compensation method for images can be provided. According to some embodiments of the present disclosure, a frequency component compensation scheme requiring relatively small amounts of computation can be provided. According to some embodiments, a higher compression rate can be achieved without degrading image quality.

Figure 8A:
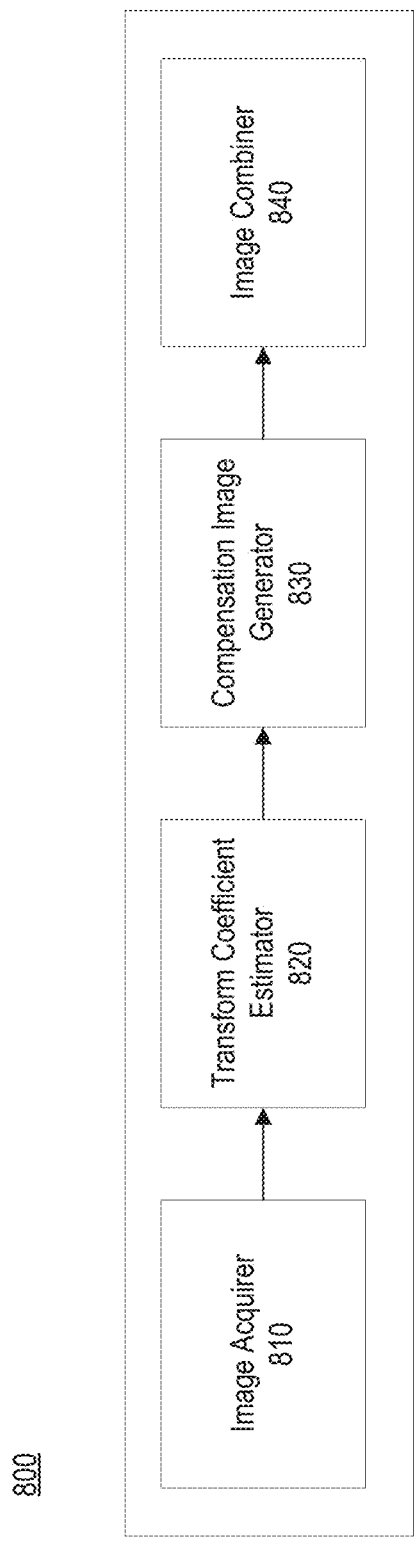
FIG. 8A is a schematic diagram of an exemplary frequency component compensation apparatus, consistent with some embodiments of the present disclosure.

FIG. 8A is a schematic diagram of an exemplary frequency component compensation apparatus, consistent with some embodiments of the present disclosure. In some embodiments, compensation apparatus 800 can be implemented in or by accelerator 200 of FIG. 2A. In some embodiments, at least part of compensation apparatus 800 can be implemented in or by core 202 of FIG. 2B or operation unit 2020 of FIG. 3. As shown in FIG. 8A, compensation apparatus 800 may comprise an image acquirer 810, a transform coefficient estimator 820, a compensation image generator 830, and an image combiner 840. Functions of compensation apparatus 800 will be explained referring to FIG. 8B, which illustrates an example process of frequency component compensation, consistent with some embodiments of the present disclosure.

Figure 8B:
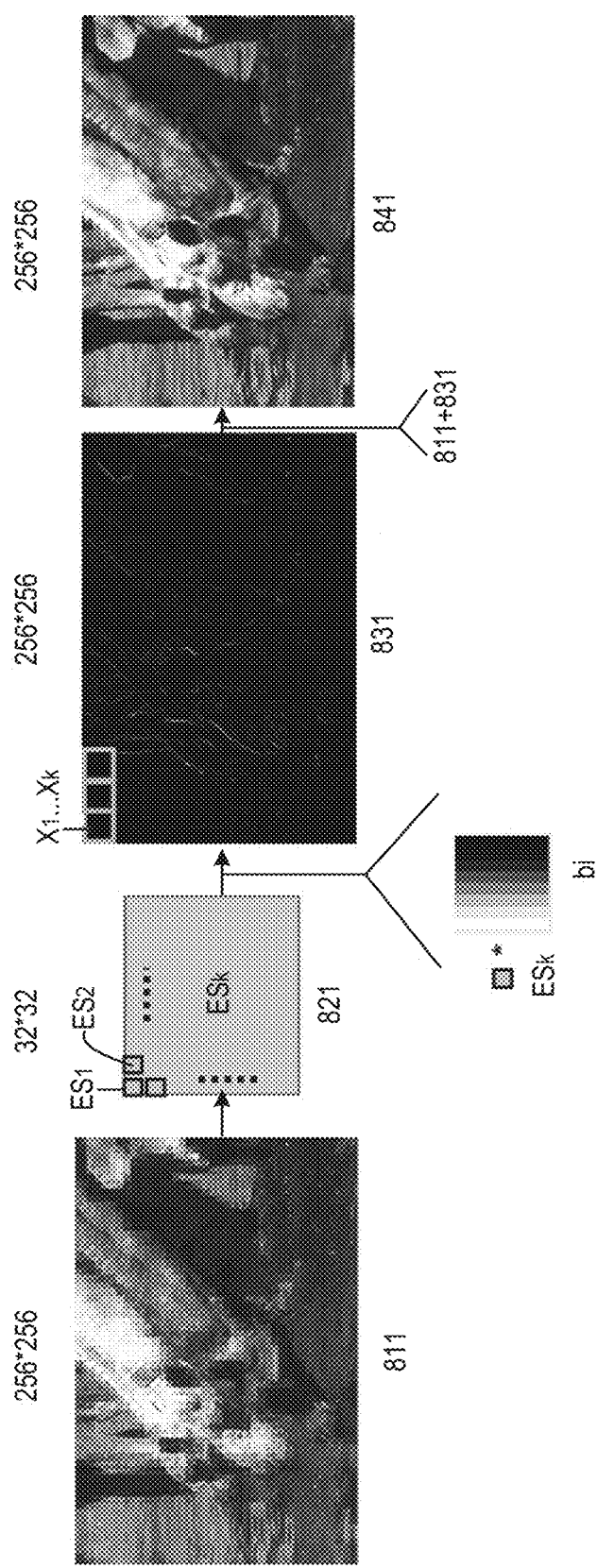
FIG. 8B illustrates an example frequency component compensation process, consistent with some embodiments of the present disclosure.

Image acquirer 810 can be configured to acquire image 811. As shown in FIG. 8B, image 811 having size 256×256 is used as an input image as an example. In some embodiments, image 811 can be a reconstructed image from a compressed image (e.g., by image compressing apparatus 400 of FIG. 4A). In the disclosure below, an image that has been compressed to generate the compressed image is referred to as an "original image" for illustration purposes only. In some embodiments, image 811 can be a reconstructed image from a compressed image that has been compressed by removing one or more frequency components from the original image during compression. In some embodiments, image 811 can be a reconstructed image from a compressed image, e.g., by binary decoding of bitstream corresponding to the compressed image, inverse quantization, and inverse transformation. In some embodiments, image acquirer 810 can be configured to acquire a compressed image as bitstream and to decompress the compressed image. In some embodiments, image acquirer 810 may communicate with image decoder (not shown) to receive decompressed image.

Referring back to FIG. 8A, transform coefficient estimator 820 can be configured to estimated transform coefficients $ES_k$ of a frequency component to compensate for image 811. According to some embodiments of the present disclosure, a number of estimated transform coefficients $ES_k$ can be determined based on a size of image 811 and a size of basis function $b_i$ that has been used when compressing a corresponding image (e.g., image 500 in FIG. 5A). According to some embodiments of the present disclosure, transform coefficient estimator 820 can have or acquire information of basis functions $b_i$ that have been used in compressing the original image to generate the compressed image. According to some embodiments of the present disclosure, one estimated transform coefficient can be generated per a portion of image 811, e.g., having a size of basis function $b_i$. In this example, a size of basis function $b_i$ is 8×8 and thus one transform coefficient can be estimated for each 8×8 pixels of image 811. In this example, transform coefficient estimator 820 can generate 32×32 (i.e., 256/8×256/8) estimated transform coefficients of a frequency component to compensate. When basis functions $b_i$ of size 4×4 are used for compression, transform coefficient estimator 820 can generate 64×64 (i.e., 256/4×256/4) estimated transform coefficients of a frequency component to compensate. In FIG. 8B, estimated transform coefficients $ES_k$ can constitute an estimated transform coefficient matrix 821 as elements. In this example, first estimated transform coefficient $ES_1$ can represent an estimated transform coefficient for first 8×8 pixels of image 811, second estimated transform coefficient $ES_2$ can represent an estimated transform coefficient for second 8×8 pixels of image 811, and so on.

In some embodiments, transform coefficient estimator 820 can be implemented by a machine learning network or deep neural network, which is configured to estimate, based on image 811, transform coefficients of a frequency component to compensate. In some embodiments, a machine learning network or deep neural network can receive, as input data, a reconstructed image (e.g., image 811), a frequency component to compensate, basis function $b_i$ corresponding to a frequency component to compensate, and so on. In some embodiments, a machine learning network or deep neural network can be trained under supervised or unsupervised learning based on previous train data. In some embodiments, a machine learning network or deep neural network can be trained to infer transform coefficients of one or more frequency components from one or more images that are reconstructed from compressed images by removing the frequency components with or without a condition that correct transform coefficients of the frequency components of original images are known. In some embodiments, transform coefficient estimator 820 can estimate transform coefficients of image 811 by down sampling image 811 with one or more convolution operations. In some embodiments, transform coefficient estimator 820 can be implemented by multiple sets of convolution operations. For example, image 811 having size 256×256 can be downsized to estimated transform coefficient matrix 821 having size 32×32 by three sets of convolution operations, and each set of convolution operations may comprise two convolution operations. For example, a first convolution operation can be Conv3×3 (convolution operation with window size 3×3) with K number of filters (e.g., 16) and stride 2 and a second convolution operation can be Conv3×3 with K number of filters (e.g., 16) and stride 1 such that image 811 can be downsized by ratio 2 by each set of convolution operations. Accordingly, image 811 can be downsized by ratio 2*2*2 in a row dimension and a column dimension by three sets of convolution operations. In some embodiments, a number of sets of convolution operations, a number of convolution operations in each set, a convolution operation window size, a number of filters, and a stride size, etc. can be varied depending on embodiments to accurately estimate transform coefficients for corresponding portions of image 811.

Referring back to FIG. 8A, compensation image generator 830 is configured to generate compensation image 831 based on estimated transform coefficient matrix 821 and basis function $b_i$ that corresponds to a frequency component to compensate. In some embodiments, it can be assumed that a frequency component corresponding basis function $b_i$ is removed from an original image when compressing and compensation apparatus 800 is configured to compensate the reconstructed image 811 for the removed frequency component. According to some embodiments of the present disclosure, compensation image generator 830 can have or acquire information of removed frequency components during compression.

According to some embodiments of the present disclosure, each estimated transform coefficient $ES_k$ of estimated transform coefficient matrix 821 corresponds to one BPU 510 having 8×8 pixels of image 811. In some embodiments, a value of each estimated transform coefficient $ES_k$ of estimated transform coefficient matrix 821 can be estimated as a transform coefficient for a certain frequency component (e.g., a removed frequency component during compression). According to some embodiments of the present disclosure, compensation image generator 830 can generate compensation image 831 for a removed frequency component by dot multiplication between estimated transform coefficients $ES_k$ and basis function $b_i$ corresponding to the removed frequency component. For example, first segment $X_1$ having 8×8 pixels can be generated by performing dot multiplication between first estimated transform coefficient $ES_1$ of estimated transform coefficient matrix 821 and basis function $b_i$ and second segment $X_2$ having 8×8 pixels can be generated by performing dot multiplication between second estimated transform coefficient $ES_2$ of estimated transform coefficient matrix 821 and basis function $b_i$. Similarly, $k^{th}$ segment $X_k$ having 8×8 pixels can be generated by performing dot multiplication between $k^{th}$ estimated transform coefficient $ES_k$ of estimated transform coefficient matrix 821 and basis function $b_i$. In some embodiments, 1024 segments $X_1$ to $X_{1024}$ corresponding to image 811 having size 256×256 can be generated. In some embodiments, 1024 segments generated above can be concatenated to generate compensation image 831 for a removed frequency component.

Referring back to FIG. 8A, image combiner 840 is configured to combine compensation image 831 and reconstructed image 811 to generate a combined image 841. As shown in FIG. 8B, compensation image 831 has a same size as reconstructed image 811 and thus compensation image 831 and reconstructed image 811 can be added element-wise to generate combined image 841. While one frequency component compensation is illustrated, it will be appreciated that multiple frequency components can be compensated by generating multiple compensation images for multiple frequency components and by adding multiple compensation images to reconstructed image 811. For example, compensation image 831 can be generated for each removed frequency component and combined image 841 can be generated by adding multiple compensation images 831 to reconstructed image 811.

According to some embodiments of the present disclosure, compensation apparatus 800 may further comprise a refine module (not shown) to improve quality of combined image 841. In some embodiments, a refine module can perform one or more convolution operations to combined image 841. In some embodiments, a refine module can perform a first convolution operation to extract higher level of features (e.g., structures of images) from combined image 841. For example, the first convolution operation can be Conv5×5 with a number of filters (e.g., 64) and stride 1. In some embodiments, a refine module can perform a second convolution operation to extract lower level of features (e.g., edges of images) from combined image 841. For example, the second convolution operation can be Conv3×5 with a number of filters (e.g., 64) and stride 1. In some embodiments, a refine module can further perform a third convolution operation to match a number of channels of combined image 841. For example, the third convolution operation can be Conv3×3 with 1 filter and stride 1 such that output image can have one channel.

Figure 9:
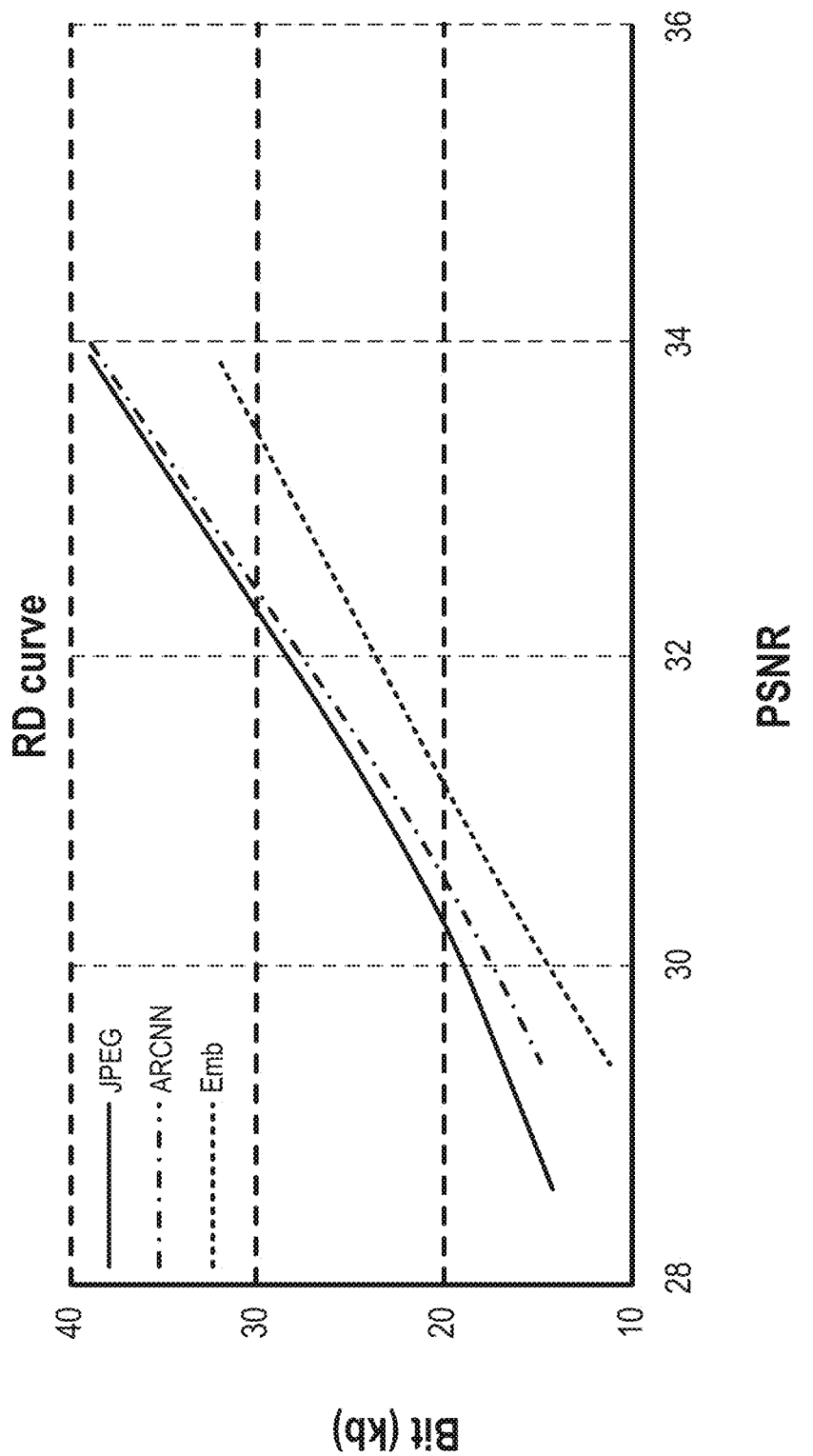
FIG. 9 illustrates an example performance comparison between conventional technologies and an embodiment of the present disclosure.

FIG. 9 illustrates an example performance comparison between conventional technologies and an embodiment of the present disclosure. In FIG. 9, JPEG represents a first conventional technology where an image is compressed by removing the five lowest frequency components and an output image is reconstructed from the compressed image without compensation. ARCNN represents a second conventional technology where an image is compressed by removing the five lowest frequency components and an output image is reconstructed from the compression image and compensated by compression artifacts reduction based on deep neural networks, which generally require more than 100 layers for compensation. Emb represents an embodiment of the present disclosure where an image is compressed by removing the five lowest frequency components and an output image is reconstructed from the compression image and compensated with removed frequency components by a frequency component compensation process according to some embodiments of the present disclosure. PSNR and bits are measured for each output image under JPEG, ARCNN, and Emb. As shown in FIG. 9, Emb shows higher PSNR than JPEG and ARCNN when an equal number of bits are used, which means Emb can provide higher quality of image than JPEG and ARCNN when an equal compression rate is applied.

According to some embodiments of the present disclosure, an efficient machine learning-based image compensation scheme can be provided. According to some embodiments of the present disclosure, an efficient neural network model that requires a relatively small number of neural network layers and can reduce computation amounts while providing higher quality compensation can be provided. According to some embodiments of the present disclosure, a specific frequency component compensation method for images can be provided. According to some embodiments of the present disclosure, a frequency component compensation scheme requiring relatively small amounts of computation can be provided. According to some embodiments, a higher compression rate can be achieved without degrading image quality.

Figure 10:
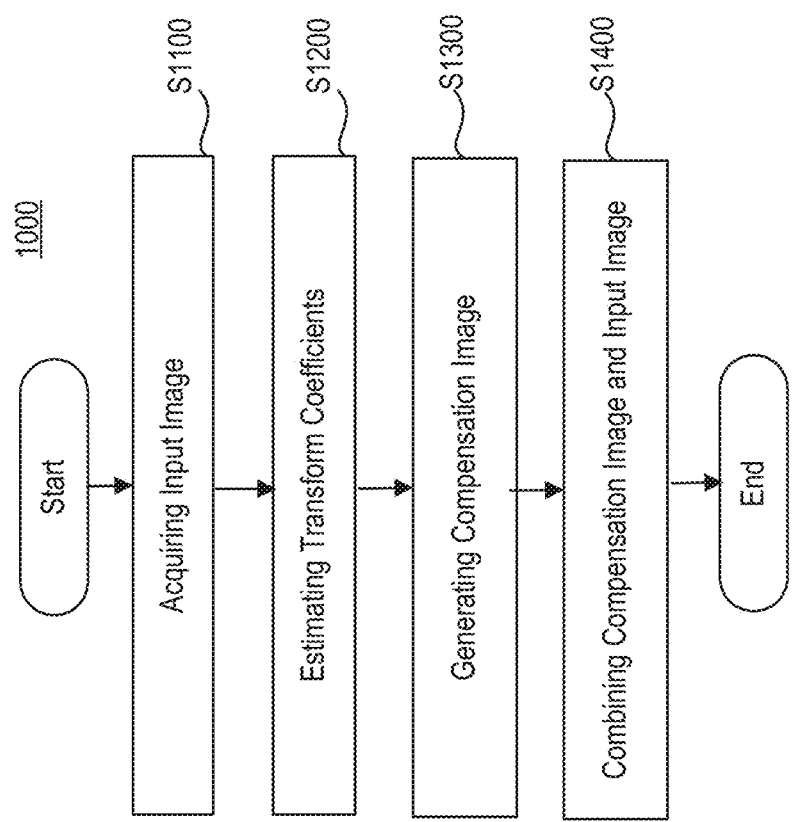
FIG. 10 illustrates an exemplary flow diagram for a frequency component compensation method, consistent with some embodiments of the present disclosure.

FIG. 10 illustrates an exemplary flow diagram for a frequency component compensation method, consistent with some embodiments of the present disclosure. For illustrative purposes, frequency component compensation method 1000 will be described referring to compensation apparatus 800 of FIG. 8A. It is appreciated that in some embodiments at least part of frequency component compensation method 1000 can be performed in or, directly or indirectly, by accelerator 200 of FIG. 2A, core 202 of FIG. 2B, or operation unit 2020 of FIG. 3.

In step S1100, input image is acquired. Step S1100 can be performed by, for example, image acquirer 810, among others. As shown in FIG. 8B, image 811 having size 256× 256 can be used as an input image as an example. In some embodiments, image 811 can be a reconstructed image from a compressed image (e.g., by image compressing apparatus 400 of FIG. 4A). In some embodiments, image 811 can be a reconstructed image from a compressed image that has been compressed by removing one or more frequency components from the original image during compression.

In step S1200, transform coefficients $ES_k$ of a frequency component to compensate for input image 811 can be estimated. Step S1200 can be performed by, for example, transform coefficient estimator 820, among others. According to some embodiments of the present disclosure, a number of estimated transform coefficients $ES_k$ can be determined based on a size of image 811 and a size of basis function $b_i$ that has been used when compressing a corresponding image (e.g., image 500 in FIG. 5A). In some embodiments, information basis functions $b_i$ that have been used in compressing the original image to generate the compressed image is known. According to some embodiments of the present disclosure, one estimated transform coefficient can be generated per a segment of image 811, e.g., having a size of basis function $b_i$. In this example, a size of basis function $b_i$ is 8×8 and thus one transform coefficient can be estimated for each 8×8 pixels of image 811. In this example, 32×32 (i.e., 256/8×256/8) estimated transform coefficients of a frequency component to compensate can be generated. As shown in FIG. 8B, estimated transform coefficients $ES_k$ can constitute an estimated transform coefficient matrix 821 as elements. In this example, first estimated transform coefficient $ES_1$ can represent an estimated transform coefficient for first 8×8 pixels of image 811, second estimated transform coefficient $ES_2$ can represent an estimated transform coefficient for second 8×8 pixels of image 811, and so on.

In some embodiments, estimated transform coefficients can be generated by a machine learning network or deep neural network, which is configured to estimate, based on image 811, transform coefficients of a frequency component to compensate. In some embodiments, a machine learning network or deep neural network can receive, as input data, a reconstructed image (e.g., image 811), a frequency component to compensate, basis function $b_i$ corresponding to a frequency component to compensate, and so on. In some embodiments, a machine learning network or deep neural network can be trained under supervised or unsupervised learning based on previous train data. In some embodiments, a machine learning network or deep neural network can be trained to infer transform coefficients of one or more frequency components from one or more images that are reconstructed from compressed images by removing the frequency components with or without a condition that correct transform coefficients of the frequency components of original images are known.

In step S1300, compensation image is generated. Step S1300 can be performed by, for example, compensation image generator 830, among others. In some embodiments, compensation image 831 is generated based on estimated transform coefficient matrix 821 and basis function $b_i$ that corresponds to a frequency component to compensate. In some embodiments, it can be assumed that a frequency component corresponding basis function $b_i$ is removed from an original image when compressing and the reconstructed image 811 is compensated for the removed frequency component. According to some embodiments of the present disclosure, information of removed frequency components during compression is known.

According to some embodiments of the present disclosure, each estimated transform coefficient $ES_k$ of estimated transform coefficient matrix 821 corresponds to one BPU 510 having 8×8 pixels of image 811. In some embodiments, a value of each estimated transform coefficient $ES_k$ of estimated transform coefficient matrix 821 can be estimated as a transform coefficient for a certain frequency component (e.g., a removed frequency component during compression). According to some embodiments of the present disclosure, compensation image 831 for a removed frequency component can be generated by dot multiplication between estimated transform coefficients $ES_k$ and basis function $b_i$ corresponding to the removed frequency component. For example, first segment $X_1$ having 8×8 pixels can be generated by performing dot multiplication between first estimated transform coefficient $ES_1$ of estimated transform coefficient matrix 821 and basis function $b_i$ and second segment $X_2$ having 8×8 pixels can be generated by performing dot multiplication between second estimated transform coefficient $ES_2$ of estimated transform coefficient matrix 821 and basis function $b_i$. Similarly, $k^{th}$ segment $X_k$ having 8×8 pixels can be generated by performing dot multiplication between $k^{th}$ estimated transform coefficient $ES_k$ of estimated transform coefficient matrix 821 and basis function $b_i$. In some embodiments, 1024 segments $X_1$ to $X_{1024}$ corresponding to image 811 having size 256×256 can be generated. In some embodiments, 1024 segments generated above can be concatenated to generate compensation image 831 for a removed frequency component.

In step S1400, input image 811 and compensation image 831 are combined. Step S1400 can be performed by, for example, image combiner 840, among others. In some embodiments, compensation image 831 and reconstructed image 811 are combined to generate a combined image 841. As shown in FIG. 8B, compensation image 831 has a same size as reconstructed image 811 and thus compensation image 831 and reconstructed image 811 can be added element-wise to generate combined image 841. While one frequency component compensation is illustrated, it will be appreciated that multiple frequency components can be compensated by generating multiple compensation images for multiple frequency components and by adding multiple compensation images to reconstructed image 811. For example, compensation image 831 can be generated for each removed frequency component and combined image 841 can be generated by adding multiple compensation images 831 to reconstructed image 811.

The embodiments may further be described using the following clauses:

1. A method for compensating an image, comprising:
   estimating transform coefficients of a frequency component for a first image based on the first image;
   performing a dot multiplication operation between the estimated transform coefficients and a basis function associated with the frequency component to generate a compensation image; and
   combining the first image and the compensation image to generate a combined image.

2. The method of clause 1, wherein estimating the transform coefficients of the frequency component for the first image comprises:
   down sampling the first image to generate a transform coefficient matrix, wherein the transform coefficient matrix comprises the estimated transform coefficients.

3. The method of clause 1 or 2, wherein a number of the estimated transform coefficients is determined based on a size of the first image and a size of the basis function.

4. The method of any one of clauses 1-3, wherein performing the dot multiplication operation between the estimated transform coefficients and the basis function associated with the frequency component to generate the compensation image comprises:
   performing a dot multiplication operation between a first estimated transform coefficient of the estimated transform coefficients and the basis function to generate a first segment of the compensation image; and
   performing a dot multiplication operation between a second estimated transform coefficient of the estimated transform coefficients and the basis function to generate a second segment of the compensation image.

5. The method of any one of clauses 1-4, wherein the first image is a reconstructed image from a compressed image of a third image, and the basis function is used to compress the third image to generate the compressed image.

6. The method of any one of clauses 1-4, wherein the first image is a reconstructed image from a compressed image of a third image, and the frequency component is removed from the third image during compression to generate the compressed image.

7. An apparatus for compensating an image, comprising:
   a memory for storing a set of instructions; and
   at least one processor configured to execute the set of instructions to cause the apparatus to perform:
   estimating transform coefficients of a frequency component for a first image based on the first image;
   performing a dot multiplication operation between the estimated transform coefficients and a basis function associated with the frequency component to generate a compensation image; and
   combining the first image and the compensation image to generate a combined image.

8. The apparatus of clause 7, wherein in estimating the transform coefficients of the frequency component for the first image, the at least one processor is configured to execute the set of instructions to cause the apparatus to further perform:
   down sampling the first image to generate a transform coefficient matrix, wherein the transform coefficient matrix comprises the estimated transform coefficients.

9. The apparatus of clause 7 or 8, wherein a number of the estimated transform coefficients is determined based on a size of the first image and a size of the basis function.

10. The apparatus of any one of clauses 7-9, wherein in performing the dot multiplication operation between the estimated transform coefficients and the basis function associated with the frequency component to generate the compensation image, the at least one processor is configured to execute the set of instructions to cause the apparatus to further perform:
    performing a dot multiplication operation between a first estimated transform coefficient of the estimated transform coefficients and the basis function to generate a first segment of the compensation image; and
    performing a dot multiplication operation between a second estimated transform coefficient of the estimated transform coefficients and the basis function to generate a second segment of the compensation image.

11. The apparatus of any one of clauses 7-10, wherein the first image is a reconstructed image from a compressed image of a third image, and the basis function is used to compress the third image to generate the compressed image.

12. The apparatus of any one of clauses 7-10, wherein the first image is a reconstructed image from a compressed image of a third image, and the frequency component is removed from the third image during compression to generate the compressed image.

13. A non-transitory computer readable medium that stores a set of instructions that is executable by at least one processor of a computing device to perform a method for compensating an image, the method comprising:
estimating transform coefficients of a frequency component for a first image based on the first image;
performing a dot multiplication operation between the estimated transform coefficients and a basis function associated with the frequency component to generate a compensation image; and
combining the first image and the compensation image to generate a combined image.

14. The computer readable medium of clause 13, wherein in estimating the transform coefficients of the frequency component for the first image, the set of instructions that are executable by at least one processor of the computing device to cause the computing device to further perform:
down sampling the first image to generate a transform coefficient matrix, wherein the transform coefficient matrix comprises the estimated transform coefficients.

15. The computer readable medium of clause 13 or 14, wherein a number of the estimated transform coefficients is determined based on a size of the first image and a size of the basis function.

16. The computer readable medium of any one of clauses 13-15, wherein in performing the dot multiplication operation between the estimated transform coefficients and the basis function associated with the frequency component to generate the compensation image, the set of instructions that are executable by at least one processor of the computing device to cause the computing device to further perform:
performing a dot multiplication operation between a first estimated transform coefficient of the estimated transform coefficients and the basis function to generate a first segment of the compensation image; and
performing a dot multiplication operation between a second estimated transform coefficient of the estimated transform coefficients and the basis function to generate a second segment of the compensation image.

17. The computer readable medium of any one of clauses 13-16, wherein the first image is a reconstructed image from a compressed image of a third image, and the basis function is used to compress the third image to generate the compressed image.

18. The computer readable medium of any one of clauses 13-16, wherein the first image is a reconstructed image from a compressed image of a third image, and the frequency component is removed from the third image during compression to generate the compressed image.

19. A terminal, comprising:
an encoder for compressing an image by removing a frequency component; and
an apparatus for compensating the frequency component for a reconstructed image of the compressed image, comprising:
a memory for storing a set of instructions; and
at least one processor configured to execute the set of instructions to cause the apparatus to perform:
estimating transform coefficients of the frequency component for the reconstructed image based on the reconstructed image;
performing a dot multiplication operation between the estimated transform coefficients and a basis function associated with the frequency component to generate a compensation image; and
combining the reconstructed image and the compensation image to generate a combined image.

20. The terminal of clause 19, wherein the encoder for compressing the image comprises:
a second memory for storing a second set of instructions; and
at least one second processor configured to execute the second set of instructions to cause the encoder to perform:
estimating a distribution of a first transform coefficient of the image;
determining a first quantization parameter based on the estimated distribution of the first transform coefficient; and
performing quantization of the first transform coefficient according to the first quantization parameter.

21. The terminal of clause 19 or 20, wherein in determining the first quantization parameter based on the estimated distribution of the first transform coefficient, the at least one second processor is configured to execute the second set of instructions to cause the encoder to further perform:
determining a standard deviation value of the distribution;
comparing the standard deviation value with a default quantization parameter corresponding to the first transform coefficient; and
in response to the standard deviation value being greater than the default quantization parameter, determining the standard deviation value to be the first quantization parameter.

22. The terminal of any one of clauses 19-21, wherein the first transform coefficient is a coefficient associated with the basis function corresponding to the frequency component.

23. The terminal of any one of clauses 19-22, wherein in estimating the transform coefficients of the frequency component for the reconstructed image, the at least one processor is configured to execute the set of instructions to cause the apparatus to further perform:
down sampling the reconstructed image to generate a transform coefficient matrix, wherein the transform coefficient matrix comprises the estimated transform coefficients.

24. The terminal of any one of clauses 19-23, wherein a number of the estimated transform coefficients is determined based on a size of the reconstructed image and a size of the basis function.

25. The terminal of any one of clauses 19-24, wherein in performing the dot multiplication operation between the estimated transform coefficients and the basis function associated with the frequency component to generate the compensation image, the at least one processor is configured to execute the set of instructions to cause the apparatus to further perform:
performing a dot multiplication operation between a first estimated transform coefficient of the estimated transform coefficients and the basis function to generate a first segment of the compensation image; and
performing a dot multiplication operation between a second estimated transform coefficient of the estimated transform coefficients and the basis function to generate a second segment of the compensation image.

26. The terminal of any one of clauses 19-25, wherein the basis function is used to compress the image to generate the compressed image by the encoder.

27. A method for compressing an image, comprising:
estimating a distribution of a first transform coefficient of an image;

determining a first quantization parameter based on the estimated distribution of the first transform coefficient; and performing quantization of the first transform coefficient according to the first quantization parameter.

28. The method of clause 27, wherein determining the first quantization parameter based on the estimated distribution of the first transform coefficient comprises:

determining a standard deviation value of the distribution;

comparing the standard deviation value with a default quantization parameter corresponding to the first transform coefficient; and in response to the standard deviation value being greater than the default quantization parameter, determining the standard deviation value to be the first quantization parameter.

29. The method of clause 27 or 28, wherein the first transform coefficient is a coefficient associated with a basis function corresponding to a frequency component.

30. An apparatus for compressing an image, comprising:

a memory for storing a set of instructions; and at least one processor configured to execute the set of instructions to cause the apparatus to perform:

estimating a distribution of a first transform coefficient of an image;

determining a first quantization parameter based on the estimated distribution of the first transform coefficient; and performing quantization of the first transform coefficient according to the first quantization parameter.

31. The apparatus of clause 30, wherein in determining the first quantization parameter based on the estimated distribution of the first transform coefficient, the at least one processor is configured to execute the set of instructions to cause the apparatus to further perform:

determining a standard deviation value of the distribution;

comparing the standard deviation value with a default quantization parameter corresponding to the first transform coefficient; and in response to the standard deviation value being greater than the default quantization parameter, determining the standard deviation value to be the first quantization parameter.

32. The apparatus of clause 30 or 31, wherein the first transform coefficient is a coefficient associated with a basis function corresponding to a frequency component.

33. A non-transitory computer readable medium that stores a set of instructions that is executable by at least one processor of a computing device to perform a method for compressing an image, the method comprising:

estimating a distribution of a first transform coefficient of an image;

determining a first quantization parameter based on the estimated distribution of the first transform coefficient; and performing quantization of the first transform coefficient according to the first quantization parameter.

34. The computer readable medium of clause 33, wherein in determining the first quantization parameter based on the estimated distribution of the first transform coefficient, the set of instructions that are executable by at least one processor of the computing device to cause the computing device to further perform:

determining a standard deviation value of the distribution;

comparing the standard deviation value with a default quantization parameter corresponding to the first transform coefficient; and in response to the standard deviation value being greater than the default quantization parameter, determining the standard deviation value to be the first quantization parameter.

35. The computer readable medium of clause 33 or 34, wherein the first transform coefficient is a coefficient associated with a basis function corresponding to a frequency component.

Embodiments herein include database systems, methods, and tangible non-transitory computer-readable media. The methods may be executed, for example, by at least one processor that receives instructions from a tangible non-transitory computer-readable storage medium (such as of a host system having host unit 220 and host memory 221 of FIG. 2A). Similarly, systems consistent with the present disclosure may include at least one processor and memory, and the memory may be a tangible non-transitory computer-readable storage medium. As used herein, a tangible non-transitory computer-readable storage medium refers to any type of physical memory on which information or data readable by at least one processor may be stored. Examples include random access memory (RAM), read-only memory (ROM), volatile memory, non-volatile memory, hard drives, CD ROMs, DVDs, flash drives, disks, registers, caches, and any other known physical storage medium. Singular terms, such as "memory" and "computer-readable storage medium," may additionally refer to multiple structures, such a plurality of memories or computer-readable storage media. As referred to herein, a "memory" may comprise any type of computer-readable storage medium unless otherwise specified. A computer-readable storage medium may store instructions for execution by at least one processor, including instructions for causing the processor to perform steps or stages consistent with embodiments herein. Additionally, one or more computer-readable storage media may be utilized in implementing a computer-implemented method. The term "non-transitory computer-readable storage medium" should be understood to include tangible items and exclude carrier waves and transient signals.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A method for compensating an image, comprising:

estimating transform coefficients of a frequency component for a first image based on the first image;

performing a dot multiplication operation between the estimated transform coefficients and a basis function associated with the frequency component to generate a compensation image; and combining the first image and the compensation image to generate a combined image.

2. The method of claim 1, wherein estimating the transform coefficients of the frequency component for the first image comprises:
   down sampling the first image to generate a transform coefficient matrix, wherein the transform coefficient matrix comprises the estimated transform coefficients.

3. The method of claim 1, wherein a number of the estimated transform coefficients is determined based on a size of the first image and a size of the basis function.

4. The method of claim 1, wherein performing the dot multiplication operation between the estimated transform coefficients and the basis function associated with the frequency component to generate the compensation image comprises:
   performing a dot multiplication operation between a first estimated transform coefficient of the estimated transform coefficients and the basis function to generate a first segment of the compensation image; and
   performing a dot multiplication operation between a second estimated transform coefficient of the estimated transform coefficients and the basis function to generate a second segment of the compensation image.

5. The method of claim 1, wherein the first image is a reconstructed image from a compressed image of a third image, and the basis function is used to compress the third image to generate the compressed image.

6. The method of claim 1, wherein the first image is a reconstructed image from a compressed image of a third image, and the frequency component is removed from the third image during compression to generate the compressed image.

7. An apparatus for compensating an image, comprising:
   a memory for storing a set of instructions; and
   at least one processor configured to execute the set of instructions to cause the apparatus to perform:
      estimating transform coefficients of a frequency component for a first image based on the first image;
      performing a dot multiplication operation between the estimated transform coefficients and a basis function associated with the frequency component to generate a compensation image; and
      combining the first image and the compensation image to generate a combined image.

8. The apparatus of claim 7, wherein in estimating the transform coefficients of the frequency component for the first image, the at least one processor is configured to execute the set of instructions to cause the apparatus to further perform:
   down sampling the first image to generate a transform coefficient matrix, wherein the transform coefficient matrix comprises the estimated transform coefficients.

9. The apparatus of claim 7, wherein a number of the estimated transform coefficients is determined based on a size of the first image and a size of the basis function.

10. The apparatus of claim 7, wherein in performing the dot multiplication operation between the estimated transform coefficients and the basis function associated with the frequency component to generate the compensation image, the at least one processor is configured to execute the set of instructions to cause the apparatus to further perform:
    performing a dot multiplication operation between a first estimated transform coefficient of the estimated transform coefficients and the basis function to generate a first segment of the compensation image; and
    performing a dot multiplication operation between a second estimated transform coefficient of the estimated transform coefficients and the basis function to generate a second segment of the compensation image.

11. The apparatus of claim 7, wherein the first image is a reconstructed image from a compressed image of a third image, and the basis function is used to compress the third image to generate the compressed image.

12. The apparatus of claim 7, wherein the first image is a reconstructed image from a compressed image of a third image, and the frequency component is removed from the third image during compression to generate the compressed image.

13. A terminal, comprising:
    an encoder for compressing an image by removing a frequency component; and
    an apparatus for compensating the frequency component for a reconstructed image of the compressed image, comprising:
       a memory for storing a set of instructions; and
       at least one processor configured to execute the set of instructions to cause the apparatus to perform:
          estimating transform coefficients of the frequency component for the reconstructed image based on the reconstructed image;
          performing a dot multiplication operation between the estimated transform coefficients and a basis function associated with the frequency component to generate a compensation image; and
          combining the reconstructed image and the compensation image to generate a combined image.

14. The terminal of claim 13, wherein the encoder for compressing the image comprises:
    a second memory for storing a second set of instructions; and
    at least one second processor configured to execute the second set of instructions to cause the encoder to perform:
       estimating a distribution of a first transform coefficient of the image;
       determining a first quantization parameter based on the estimated distribution of the first transform coefficient; and
       performing quantization of the first transform coefficient according to the first quantization parameter.

15. The terminal of claim 14, wherein in determining the first quantization parameter based on the estimated distribution of the first transform coefficient, the at least one second processor is configured to execute the second set of instructions to cause the encoder to further perform:
    determining a standard deviation value of the distribution;
    comparing the standard deviation value with a default quantization parameter corresponding to the first transform coefficient; and
    in response to the standard deviation value being greater than the default quantization parameter, determining the standard deviation value to be the first quantization parameter.

16. The terminal of claim 14, wherein the first transform coefficient is a coefficient associated with the basis function corresponding to the frequency component.

17. The terminal of claim 13, wherein in estimating the transform coefficients of the frequency component for the reconstructed image, the at least one processor is configured to execute the set of instructions to cause the apparatus to further perform:

down sampling the reconstructed image to generate a transform coefficient matrix, wherein the transform coefficient matrix comprises the estimated transform coefficients.

18. The terminal of claim 13, wherein a number of the estimated transform coefficients is determined based on a size of the reconstructed image and a size of the basis function.

19. The terminal of claim 13, wherein in performing the dot multiplication operation between the estimated transform coefficients and the basis function associated with the frequency component to generate the compensation image, the at least one processor is configured to execute the set of instructions to cause the apparatus to further perform:

performing a dot multiplication operation between a first estimated transform coefficient of the estimated transform coefficients and the basis function to generate a first segment of the compensation image; and performing a dot multiplication operation between a second estimated transform coefficient of the estimated transform coefficients and the basis function to generate a second segment of the compensation image.

20. The terminal of claim 13, wherein the basis function is used to compress the image to generate the compressed image by the encoder.

\* \* \* \* \*